US011353691B1

(12) United States Patent
Harfouche et al.

(10) Patent No.: US 11,353,691 B1
(45) Date of Patent: Jun. 7, 2022

(54) HIGH-SPEED IMAGING WITH A SUB-SAMPLED ARRAY OF IMAGE SENSORS

(71) Applicant: Ramona Optics Inc., Durham, NC (US)

(72) Inventors: Mark Harfouche, Durham, NC (US); Jaehee Park, Durham, NC (US); Gregor Horstmeyer, Durham, NC (US); Veton Saliu, Durham, NC (US)

(73) Assignee: Ramona Optics Inc., Durham, NC (US)

( * ) Notice: Subject to any disclaimer, the term of this patent is extended or adjusted under 35 U.S.C. 154(b) by 0 days.

(21) Appl. No.: 17/157,911

(22) Filed: Jan. 25, 2021

Related U.S. Application Data

(60) Provisional application No. 62/965,890, filed on Jan. 25, 2020.

(51) Int. Cl.
*H04N 5/268* (2006.01)
*H04N 7/18* (2006.01)
*G02B 21/36* (2006.01)

(52) U.S. Cl.
CPC .......... *G02B 21/365* (2013.01); *H04N 5/268* (2013.01)

(58) Field of Classification Search
CPC ........ H04N 5/268; H04N 7/18; G02B 21/365; G02B 21/367; G02B 21/002; G02B 21/00; G02B 21/0032
USPC .............................. 348/80, 79; 359/368, 385
See application file for complete search history.

(56) References Cited

U.S. PATENT DOCUMENTS

2004/0090667 A1\* 5/2004 Gartner ................ G02B 21/247
359/368
2020/0382721 A1\* 12/2020 Harfouche ......... G01N 21/8806

\* cited by examiner

*Primary Examiner* — Sherrie Hsia
(74) *Attorney, Agent, or Firm* — Tue Nguyen; patent2ip LLC

(57) ABSTRACT

A method to capture microscopy images from multiple image sensors and to relay them to one or more central processing units with high frame rates can include preprocessing the image data from the image sensors to reduce the sizes of the captured images, before sending the image data to a central processing station for analysis. Using multiple image sensors and an image reduction process, large image frames of over 20 megapixels and up to 1 gigapixel or more can be obtained at high imaging frame rates of 30 or more to up to hundreds or thousands of frames per second.

20 Claims, 17 Drawing Sheets

Forming a computational microscope, wherein the microscope comprises a camera array illuminated by one or more patterned illuminations from an illumination source, wherein the camera array is configured to send the images in full image frames or by reduced sizes, wherein the microscope further comprises a processor configured to process images captured by the camera array
200

*FIG. 2A*

Obtaining a higher frame rate for a large captured image size by configuring camera array to send reduced image sizes
220

*FIG. 2B*

Generating an illumination pattern on a sample
240

Taking n images from n cameras, wherein at least two images of the n images are overlapped
250

Sending full raw images, portions of the full raw images, or processed images to a computational unit for analysis
260

Optionally repeating for other illumination patterns
270

*FIG. 2C*

Forming a computational microscope, wherein the microscope comprises a camera array illuminated by one or more patterned illuminations from an illumination source, wherein a camera of the camera array is configured to preprocess captured images to reduce sizes of the images before sending to a processor for analysis, wherein the size reduction comprises at least one of a subsampling process, a binning process, or a data compression process
700

*FIG. 7A*

Capturing images by cameras of a camera array
720

Processing the images to reduce sizes of the images, wherein the size reduction comprises at least one of a subsampling process, a binning process, or a data compression process
730

Sending the processed images, in multiple parallel data streams, to a process module for organizing into a data packet stream before reaching a computational system for image analysis
740

*FIG. 7B*

HIGH-SPEED IMAGING WITH A SUB-SAMPLED ARRAY OF IMAGE SENSORS

The present patent application claims priority from U.S. Provisional Patent Applicant Ser. No. 62/965,890, filed on Jan. 25, 2020, entitled "High-speed imaging with a sub-sampled array of image sensors", of the same inventors, hereby incorporated by reference in its entirety.

BACKGROUND OF THE INVENTION

Most digital imaging technologies to date rely on a single image sensor, which includes an array of light-sensitive pixels, such as CMOS or CCD. Current sensors typically include millions to several tens of millions of pixels, to form images with several to tens of megapixels of information. While the cost of such multi-megapixel CMOS image sensors has dramatically decreased over the past decade, from hundreds of dollars to fractions of a dollar per sensor, the number of available pixels per sensor has not dramatically increased. That is, it is still not possible to easily obtain image sensors with multiple hundreds of megapixels. While several sensors with up to 100-200 megapixels exist, due to manufacturing difficulties and low yields, these sensors remain prohibitively expensive (tens of thousands of dollars) for many applications.

At the same time, all current image sensors of any size exhibit a limited frame rate (i.e., the number of frames containing a set of N digitized pixel values from the sensor array per second). This limited frame rate is caused by a number of limitations, including a limited rate of information that can be read off of the sensor per second, a limited data transfer rate from off of the sensor to another location, and potential limits faced by heating or other effects, for example. A general survey of currently available sensors suggests that the product of the maximum frame rate of a sensor M and the number of pixels within each frame N faces a practical upper bound D of approximately 1 Gigabyte/second (that is, $MN < 1$ GB=D). There are certainly exceptions to this limit, but it is in general observed across many currently available CMOS sensors.

Thus, there is a need for a technology that can circumvent this limitation to offer very large frames (N>10 MP or more) at high frame rates (>30 fps, and up to thousands of fps).

SUMMARY OF THE EMBODIMENTS

This patent proposes a system and method to obtain video images at a frame rate that is faster than standard video rates (30 or more frames per second), but with a very large number of image pixels per frame (over 20 megapixels, and up to 1 gigapixel or more). The proposed invention is comprised of more than one digital image sensor, each with an associated lens that images a unique field-of-view (i.e., a unique area within object space), which routes data to a centralized processing location that can both control the sensor properties, and direct image data collected by each image sensor to computer memory. Collected image data from each sensor can be tiled together to form a full image of the object of interest. Each sensor can be configured to return image data at a high frame rate by reading from a subset of its pixels. The combination of these two insights yields a system than can capture images, for example, with tens of megapixels at hundreds to thousands of frames per second.

In some embodiments, the present invention discloses methods and systems to capture microscopy images from multiple image sensors and relay them to one or more central processing units with high frame rates. The method involves preprocessing the image data from the image sensors to reduce the sizes of the captured images, before sending to a central processing station for analysis. Using multiple image sensors and an image reduction process, large image frames of over 20 megapixels and up to 1 gigapixel and high frame rates of 30 or more to up to hundreds or thousands of frames per second can be obtained.

In some embodiments, the methods can offer a system, such as microscope system, with the ability to select desired final image pixel count and desired frame rate for a large frame captured by multiple cameras. The microscope system can also include fast data transfer, which includes parallel data transfer from the cameras, organizing data into data packets having the size of a partial image frame, selecting data transfer interfaces for matching bandwidths, and direct memory access for sending image data directly to the memory of the central processing station.

BRIEF DESCRIPTION OF THE DRAWINGS

FIGS. 2A-2C illustrate flow charts for a system with large frames and high frame rates according to some embodiments.

FIGS. 7A-7B illustrate flow charts for a system with large frames and high frame rates according to some embodiments.

DETAILED DESCRIPTION OF THE EMBODIMENTS

Figure 1:
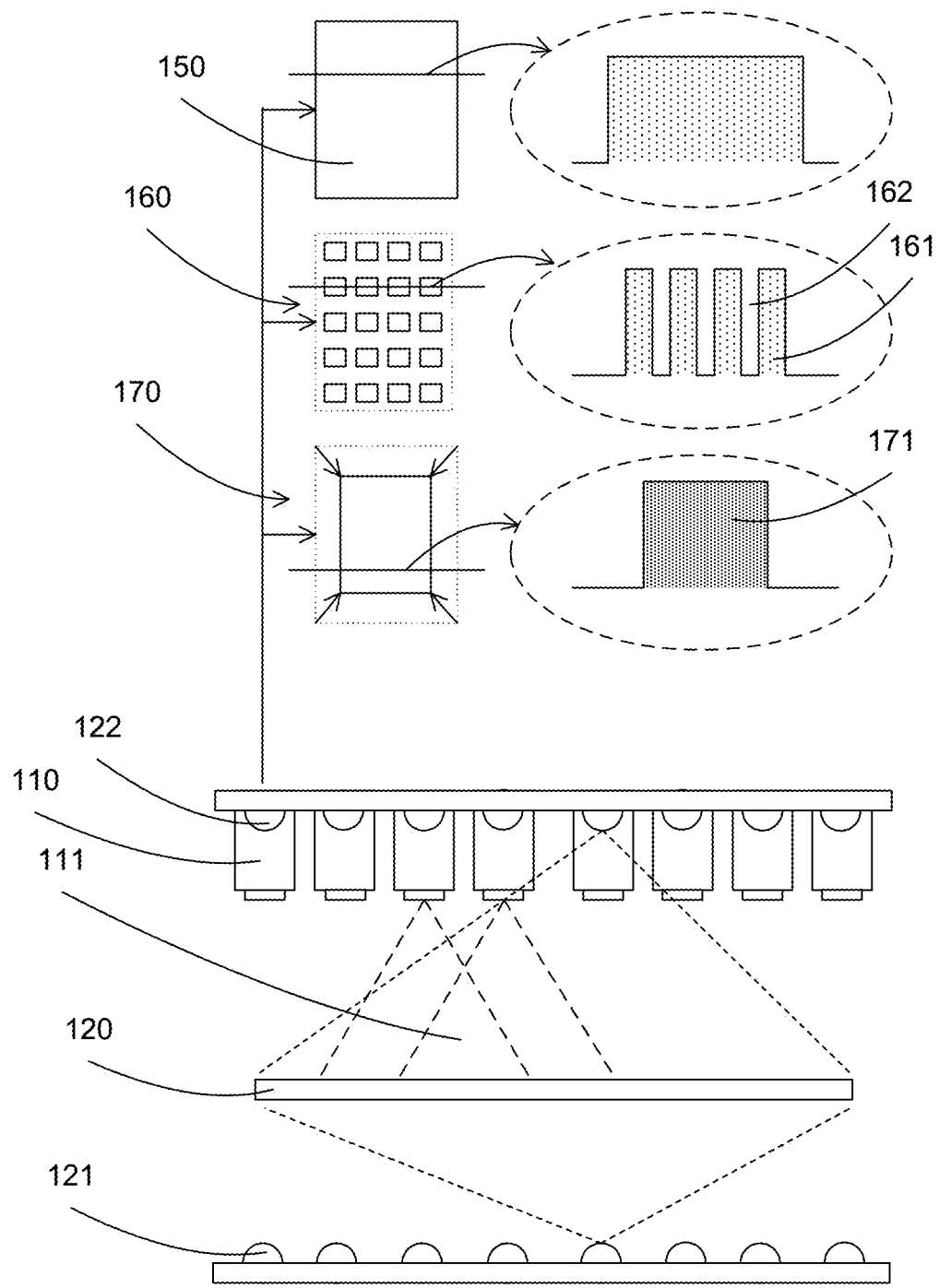
FIG. 1 illustrates a schematic configuration for a system according to some embodiments.

In some embodiments, the present invention discloses systems and methods to capture images having very large frames, such as greater than 10 MP (megapixel) or more, such as up to gigapixels, and at high frame rates, such as greater than 30 fps, and up to thousands of fps. The image capture process can also provide an image reconstruction of a sample using a spatial-angular distribution of light reaching the sample to offer at least a measure of sample depth, spectral (e.g., color) properties, optical phase at the sample plane, or a higher image resolution than the that defined by the diffraction limit. Further, the image capture process can offer an optimization between large frames, high frame rates, and image reconstructions.

The image capture process can achieve large frames, high frame rates, and image reconstructions through an optimized data transfer between the image sensors, which are configured to capture the images, and a computational system, which is configured to process the image data.

In some embodiments, the image capture process can be used in a system having more than one digital image sensor, each with an associated lens that images a unique field-of-view (i.e., a unique area within an object space), which routes data to a centralized processing station. The central processing station can control the image sensor properties, such as providing imaging parameters to the image sensors, and direct image data captured by each image sensor to a memory of the central processing station. The captured image data from the image sensors can be tiled together, such as using a stitching process which aligns features from the spatially overlapping portions of the image data, to form a full image of the object of interest. The full image can have a very large frame size or can image a large area of the sample, through the tiling of multiple image sensors. The system can be operated in a video recording mode, wherein multiple full images are acquired over time. The use of multiple image sensors can require a high data transfer rate between the image sensors and the central processing station, in particular when operated in video recording mode, which can be achieved through a careful design of the system hardware and software.

The image sensor can be configured to return image data at a high frame rate, such as at a desired frame rate determined by a user inputted to the central processing station, by using an image reduction process, such as a sub sampling process or a binning process, for the captured image data, such as reading from a subset of its pixels. The use of an image reduction process can reduce the requirements of the high data transfer rate per each set of image frames captured by the multiple image sensors, which can allow the system to have a high video frame rate. The combination of using multiple image sensors and an image reduction process can yield a system than can capture images with up to tens to hundreds of megapixels at hundreds to thousands of frames per second.

The image sensor can be configured to capture images that are produced under illumination from unique spatial-angular distributions of light, e.g., through an illumination source configured to shine light on the sample from multiple angles and spatial patterns, so that the spatial and angular properties of light reaching the sample changes over time. The images captured under the unique spatial and angular distributions of illumination can be processed to reconstruct an image of the sample, with improved image characteristics. The use of multiple variably illumination patterns can also require a high data transfer rate between the image sensors and the central processing station, which can be achieved through an optimization of image acquisition hardware, data aggregation digital logic, firmware, and integration with data post processing on the central processing station.

In some embodiments, the use of an image reduction process with multiple image sensors and variably illumination patterns can offer a data transfer rate suitable for capturing images having a large image frame, high frame rates and improved image characteristics. Further, the system can offer optimized frame rates and image characteristics through a compromise between the sub sampling rate of the sub sampling process and the number of illumination patterns of the variably illumination patterns.

In some embodiments, the image reduction process can be a way to potentially speed-up the process of patterned illumination. For example, a system using 54 unique 13 megapixel image sensors to achieve a large image frame can capture and save 6 full frames per second. To improve image characteristics, such as to obtain depth measurements or higher resolution, a variably illumination setting can require 24 different illumination patterns, which would take 4 seconds for capturing full frame image data for an image reconstruction of 24 image frames, each captured through a different illumination pattern. The 4 second time can be too long for some fast-moving organisms, since there can be small movements within that time window. The image reduction process can assist in speeding up the data acquisition process to allow the analysis of the fast-moving organisms. For example, with a sub-sampling process having a sub sampling factor of 16 (e.g., 4×4 sub-sampling, which will reduce the total number of saved pixels within each image frame by 16), the total image acquisition time can be reduced by a factor of 16, e.g., to 0.25 seconds to capture 24 uniquely illuminated image frames, which can be acceptable for many applications.

General Concept

In some embodiments, the present invention discloses systems and methods of capturing large image frames with high frame rate in an array of multiple small microscopes (i.e., micro-cameras), tiled together in an array. Using a tightly packed array of micro-cameras, high resolution (1-10 µm) over a large area (hundreds of square centimeters) can be achieved. Using an image reduction process including a sub sampling process, a binning process, or a data compression process, high frame rates of up to hundreds or thousands of frames per second can be achieved.

FIG. 1 illustrates a schematic configuration for a system according to some embodiments. The system 100, such as a microscope system, can include an array of cameras 110 and a patterned illumination source 121 and 122 for microscopic imaging. The cameras 110 are configured to image partially overlapping field of views (FOV) 111 of image areas of a sample 120. With multiple cameras, and for a fixed resolution setting, the system can have multiple times larger field of view, as compared to systems having a single camera. For example, for a microscope system having n cameras, the captured images can have an approximately k times larger field-of-view per snapshot than a standard microscope.

In some embodiments, the system can be configured to have the cameras sending out image data in parallel, to thus achieve a faster data transfer rate as compared to a single camera having a large image sensor. For example, the microscope system can capture and process 800 MP per frame at 5 frames per second due to the parallel image data transfer from the multiple cameras.

In some embodiments, the cameras can be configured for pre-processing the capture image data, e.g., processing the data before sending the data out to a central processing station for analysis. For example, the cameras can include a pre-process module, which can configured to send out the full image data 150, to send out reduced image data 160, e.g., sending out pixels 161 and skipping pixels 162, or to send out compressed image data 170, with the compressed data 171 having a smaller number of bits than the full image data 150, but carrying essentially the same amount of information (e.g., lossless compression or a lossless JPEG compression) or carrying the essential information (e.g., lossy compression or lossy JPEG compression) of the full image data. Alternatively, compressed image data may simply be a windowing of the sensor imaging area, for example from a sensor that originally includes M×N pixels, only pixel data from the center M/2×N/2 area of the sensor may be read off to decrease the total amount of image information.

In some embodiments, the image reduction process can include a sub sampling process, in which an image is reduced in its dimensions to obtain a smaller image. The sub sampling process reduces the image size by removing information all together, e.g., removing the subsequent pixels in both directions. For example, a 2×2 sub sampling process can keep one pixel for every 4-pixel area, resulting in a factor of 4 in image size reduction.

In a sub sampling process, the pixels in an image can be thrown away in subsequent or sets of repeating rows or columns to create a reduced size image. For example, to create a half-sized image, e.g., an image having sizes in both x and y dimensions being half the original sizes, the sub sampling process can throw away every other row and column, forming a 2×2 sub sampling process. When the sampling rate gets too low, e.g., the sub sampling image becomes too small as compared to the original image, the details in the original image cannot be captured in the sub sampling image anymore. Thus, the sub sampling process can have limits to still produce a full-fidelity imaging result, which is called the Nyquist rate, which specifies the minimum signal or image rate.

In the sub sampling process, an interpolation or a smoothing process can be used to reduce aliasing. When the original image has high frequencies, e.g., high details, and the pixel sampling rate is not high enough to capture the details, the sub sampling process can generate incorrect signals or images, e.g., an alias. Thus, the sampling rate should be high enough to capture the highest frequency in the image. To avoid aliasing, the sampling rate can be greater or equal to the maximum frequency in the image, or can be equal or greater than 2× the maximum frequency. Alternatively, the image can be subjected to a filter process, such as a low pass filter or a Gaussian filter to blur the image, before being sub sampled.

The image reduction can include an image binning process, in which the image size is reduced by averaging the information in each bin of pixels, such as forming a super pixel for each bin. For example, the image can be partitioned into non-overlapping M×N tiles, where M and N are the numbers of rows and columns of a tile, and each tile gets replaced with a representative value, such as the average values of the pixels in the tile. The binning process can reduce minor fluctuations caused by noise because of the averaging process.

Thus, with an image reduction process, the image frame rates of the system can be significantly increased. For example, the maximum frame rate vs binning or sub sampling curve is approximately linear but with small deviations. Thus, a microscope system capable of processing 800 MP per frame at 5 frames per second, using a binning process of 2×2 for V=4, can offer 200 MP images at 20 frames per second, which is nearly the video rate of 24 frames per second. The high frame rates at high pixel counts can open up new applications for example, in observing fast mechanisms of living organisms.

The sub sampling process can be based on an image perception, e.g., by reducing the resolution for features that are not highly noticeable, the image sub sampling process can reduce the image size with less noticeable loss of image quality. For example, in color images encoded with luminance and chrominance, the chrominance can be sub sampled to reduce the image size since changes in chrominance are less noticeable than luminance. For example, the chrominance values can be sub sampled by ½ or even ¼ of that of the luminance, e.g., the intensity. Even with such as a rather high sub sampling rate, the differences in terms of perceived image quality are hardly noticeable. Moreover, in color image sensors with a Bayer filter pattern, sub-sampling by pixel binning across ach 2×2 Bayer filter pattern area can produce a grayscale image with 4× fewer total pixels than what is required to read off the sensor for a color image, while yielding a 4× increase in imaging frame rate for the grayscale image.

The image reduction can include an image compression process, which can reduce the size of the image in a loss or lossless compression. The image compression process can reduce the image size, such as reducing the quality of the image by discarding unnecessary data, such a limiting the colors used in the image.

In some embodiments, the image reduction process, e.g., the sub sampling process, the binning process or the image compression process, can be performed in a pre-process module in the camera, such as integrated with the camera image sensor, or closely interfaced with the image sensor, to prevent delays in data transfer from the image sensor to the central processing station. For example, the sub sampling process can be performed by a module coupled to the image sensors to select digital light intensity value from a pixel and skip other pixels, such as skipping every other row and column in a 2×2 sub sampling process. The binning process can be performed by combining digital light intensity values from adjacent pixels in the image sensor, such as in a CCD (charge coupled device) or CMOS device, to reduce the total number of bits per frame that must be read off of each sensor device. The low pass, Gaussian filter, or the data compression can be performed with appropriate logic devices. For example, a field programmable gate array (FPGA) can be integrated with the image sensor to perform image compression. The integration of the image reduction process with the image sensor can significantly reduce delays in performing the image reduction process.

FIGS. 2A-2C illustrate flow charts for a system with large frames and high frame rates according to some embodiments. In FIG. 2A, operation 200 forms a computational microscope, with the microscope including a camera array having multiple cameras illuminated by one or more patterned illuminations from an illumination source. The camera array is configured to send the images in full image frames or by reduced sizes, wherein the microscope further comprises a processor configured to process images captured by the camera array. The images can have the sizes reduced in a pre-processed module integrated with the image sensors of the cameras in the camera array.

In FIG. 2B, operation 220 obtains a higher frame rate for large captured image frames by configuring a camera array to send reduced image sizes. The images can have the sizes reduced in a pre-processed module integrated with the image sensors of the cameras in the camera array.

In FIG. 2C, operation 240 generates an illumination pattern on a sample. Operation 250 captures n images from n cameras, wherein at least two images of the n images are overlapped. Operation 250 sends full raw images, portions of the full raw images, or processed images to a computational unit for analysis. The images are sent in multiple parallel data streams to improve a data transfer rate. Operation 260 optionally repeats for other illumination patterns.

General Data Flow for Sub Sampling

Figure 3:
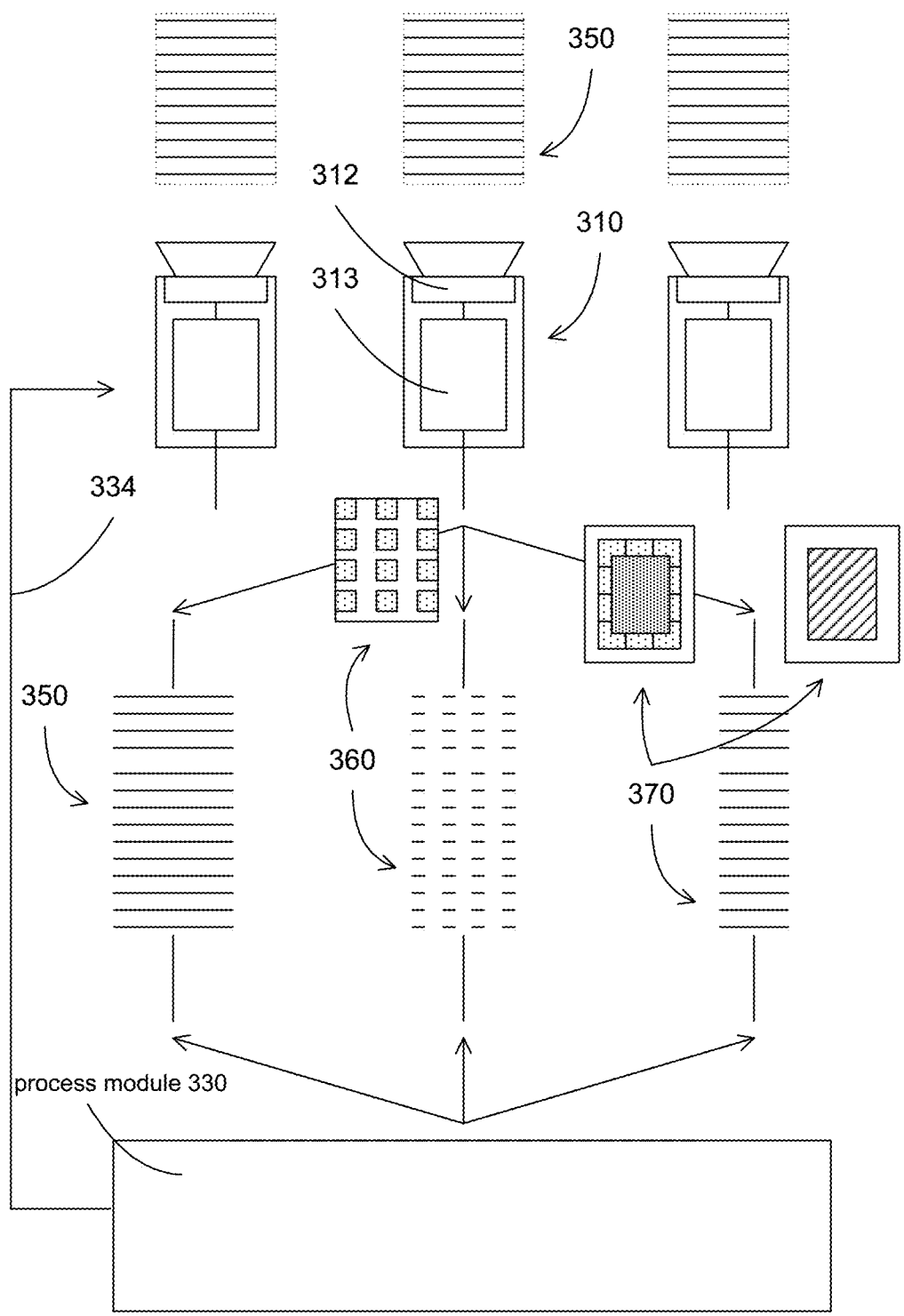
FIG. 3 illustrates a data flow for an image reduction process according to some embodiments.

FIG. 3 illustrates a data flow for an image reduction process according to some embodiments. Multiple cameras 310 can be configured to capture images 350, for example, through image sensors 312. The captured image data can be pre-processed, for example, by a pre-process module 313, to generate full size images 350, or reduced size images, such as sub sampling or binning images 360 or compressing images 370.

In some embodiments, the cameras 310 can receive instructions 334, such as receiving image parameters, from a process module 330. The instructions can include instructions for sending full images or for sending reduced images, such as for sub sampling rate, binning rate, compressed rate, or any combination. The process module 330 can be configured to receive multiple data streams from the cameras in parallel, to have a high data transfer rate. The process module 330 can include multiple circuits configured to process the multiple data streams in parallel.

In some embodiments, the pre-processing process can occur in modules integrated with the image sensors to minimize delays in data transfer. For example, the captured image data can be pre-processed to skipping pixels in a periodic or non-periodic manner. The captured image data can be pre-processed to read a continuous subset of pixels in an area of the full image frame. The captured image data can be pre-processed to combine pixel intensities in each bin of pixels to form an average intensity for the bin. The captured image data can be pre-processed to compress the image data, or via another image data reduction process.

For example, the pre-processing process can be configured to remove adjacent or nearby pixels that do not have significant variation in intensities, e.g., pixels having similar intensities. The pre-processing process can be configured to remove adjacent or nearby pixels that have small variations in intensities. The removal process can be performed by first obtaining the spatial derivative of each image sensor frame, e.g., calculating the intensity gradients between adjacent or nearby pixels. The pixels with the spatial derivative, e.g., intensity gradient, less than a pre-defined threshold value are then removed, saving only the pixel values and the pixel locations with a value greater than the pre-defined threshold value. In some embodiments, a pixel having a representative spatial derivative can be saved, to retain at least a pixel with small intensity variations. The concept of spatial derivative can be summarized by a 2D convolution kernel that takes the form of $[-1, 1; -1, 1]$, for a simple 2×2 convolution kernel, which is convolved with the image to produce the spatial derivative output. This simple 2×2 convolution kernel can be replaced by one or more convolution kernels of different sizes, e.g. taking the form of wavelet convolution kernels, for an alternative means to reduce image data.

In some embodiments, the removal process can be performed by first obtaining the temporal derivative of each image sensor frame, e.g., calculating the intensity gradients between pixels in sequential image frames. The pixels with the temporal derivative, e.g., intensity gradient with respect to time, less than a pre-defined threshold value are then removed, saving only the pixel values and pixel locations with a value greater than the pre-defined threshold value. Image frame data from a previous image capturing process by the same image sensor can be stored, such as in a buffer, to enable the temporal derivative removal process. The concept of temporal derivative can be summarized by a 1D convolution kernel that takes the form of $[-1, 1]$, for a simple 1×2 convolution kernel, which is convolved with the two image frames to produce the temporal derivative output. This simple 1×2 convolution kernel can be replaced by one or more convolution kernels of different sizes with 2 or more frames, e.g. taking the form of wavelet convolution kernels, for an alternative means to reduce image data In some embodiments, a pixel having a representative spatial derivative can be saved, to retain at least a pixel with small intensity variations.

In some embodiments, the image reduction process can include a combination of size reduction processes, such as a combination of image sub-sampling, image binning, image removal of small intensity variations, or image compression. The combination of size reduction processes, performed in a pre-processing module integrated to the image sensors, can further reduce transmitted data rates and subsequently lead to higher total system frame rates.

Figure 4:
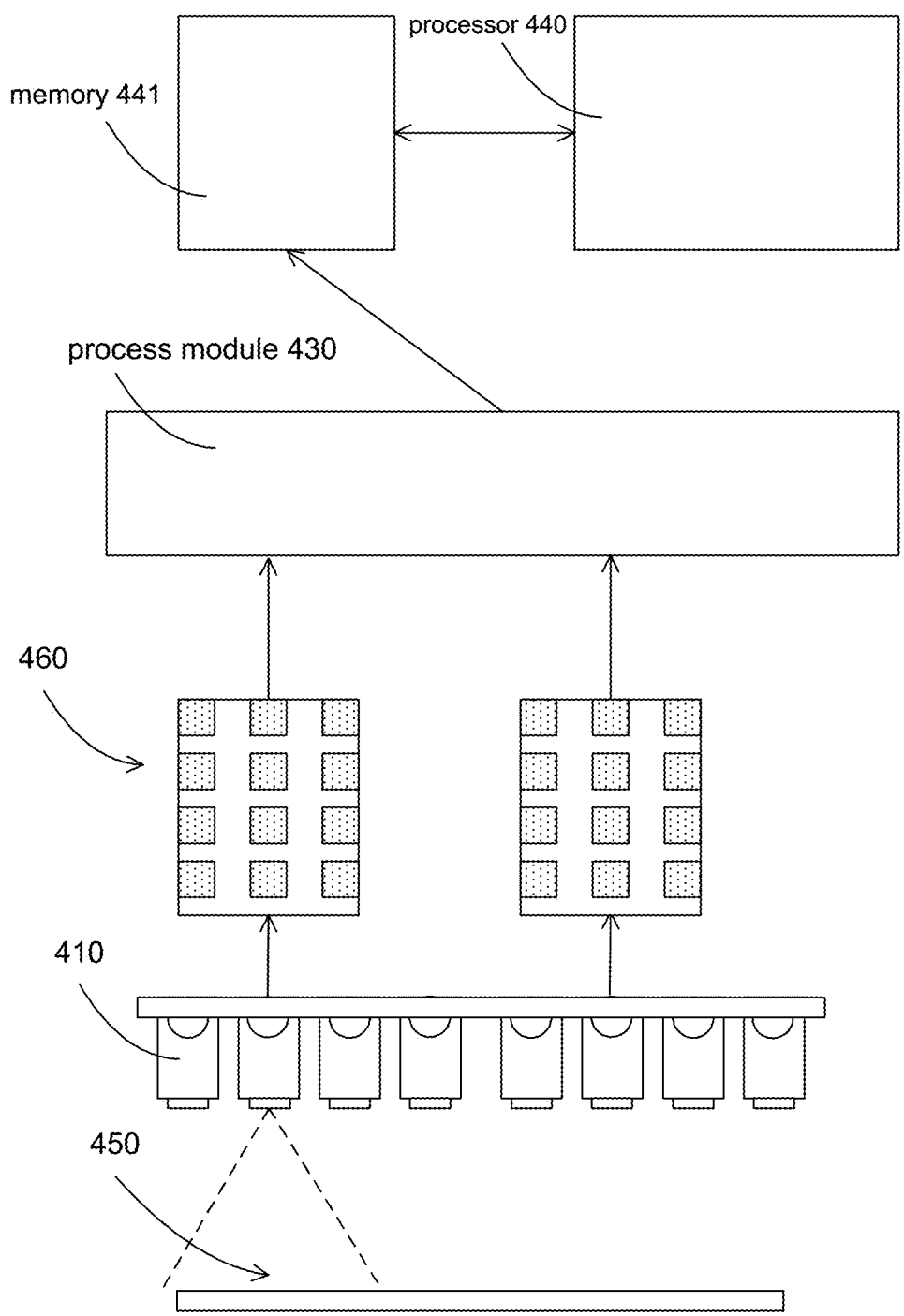
FIG. 4 illustrates a sub sampling process for an image reduction process according to some embodiments.

FIG. 4 illustrates a sub sampling process for an image reduction process according to some embodiments. Multiple cameras 410 can be configured to capture images 450. The captured image data can be pre-processed to generate reduced size images, such as sub sampling or binning images 460. The pixel sub sampling process can be used on each of the individual image sensors to reduce the number of pixels that transmit optical image data. For example, in a 3×2 sub sampling process, each image sensor can read off every third pixel in the first row of pixels (i.e., does not read pixels from columns 2 and 3, 5 and 6, etc.), and then skips every other row (i.e., does not read pixels from even-numbered rows). Any number of rows and/or columns may be skipped. Further, the sub sampling process can use a pattern that is not periodic. After sub-sampling by a factor of V (i.e., skipping V−1 pixels for every pixel read out), N/V pixels per frame are sent to the central processing unit, with N being the number of pixels in the frame. This implies that V more frames per second can be sent from each image sensor to the central processing unit within a fixed amount of time as compared to imaging all N pixels per frame. For example, in the 3×2 sub sampling process described above, V=6, for an increase of 6 in frame rate.

In some embodiments, the image sensors in cameras 410 capture optical data, which is typically digitized on the image sensor, such as a CMOS sensor, and which is then sent as digital electronic signals in multiple data streams 435 to a process module 430, which can organize the data to send to a memory 441 associated with a processor 440 of a central processing station in a serial data stream 445.

In some embodiments, the process module 430 can be a field programmable gate array (FPGA), which can collect, re-arrange, and re-transmit the acquired image data to the memory in the serial data stream 445. The FPGA can also send digital signals to the cameras, e.g., to the pre-process module in the cameras, to configure the image sensors to sub-sample from the image sensor array according to a configuration or at a sub-sampling rate, instructed by a user.

After the image data is saved in computer memory, a post-processing algorithm may then, for example, combine the acquired micro-camera images together into a final composite image that has a larger FOV than any of the individual micro-cameras individually. After post-processing, the final result can then be displayed to a user or stored in digital memory.

Figure 5:
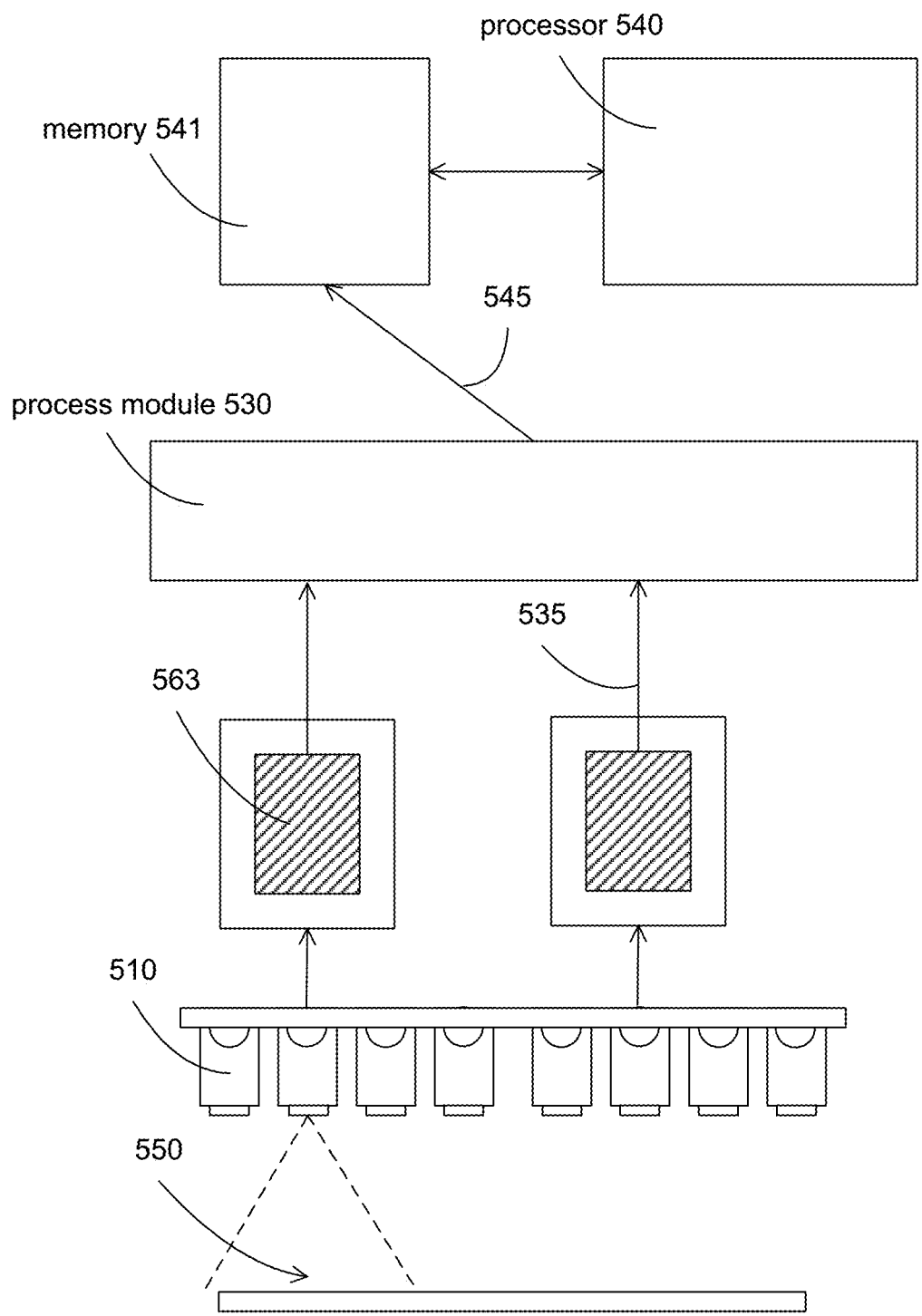
FIG. 5 illustrates a windowing sub sampling process for an image reduction process according to some embodiments.

FIG. 5 illustrates a windowing sub sampling process for an image reduction process according to some embodiments. Multiple cameras 510 can be configured to capture images 550. The captured image data can be pre-processed to generate reduced size images, in which instead of skipping pixels in a periodic or non-periodic manner, a continuous subset of W pixels is read from the full image frame to obtain a window 563, such as reading the center portion of the image from the image sensors, to send to the process module. With the sub sampling process reads out image window 563 having W pixels, the frame rate is increased by a factor of V=N/W, with N being the number of pixels in the frame. The cameras 510 can send multiple data streams to a process module 530, which can organize the data to send to a memory 541 associated with a processor 540 of a central processing station.

With a sub-sampling strategy, given a data rate limit D=NM, where N is the number of pixels within each frame and M is the frame rate for each sensor, and a selected sub sampling factor V for each sensor, then it is possible to achieve a frame rate that is approximately MV from each sensor. The increase in frame rate is at the expense of the reduction in pixels in the image frames, e.g., the frames from each sensor now only have N/V pixels in them, for a reduction of V due to the sub sampling process.

In some embodiments, to increase the image size or a resolution, e.g., to make up for the lost pixels created by the sub sampling process, at least a factor of V additional micro-cameras can be added to the camera array. The additional micro-cameras can have the same field of view as the original camera array, which results in a same image frame with the added V factor of the pixels. The additional micro-cameras can have overlapped field of views, such as with the original camera array and with each other, which results in a much larger image frame, e.g., V factor larger image frame.

After fusing the images from the camera array and the additional micro-cameras together, the system can create composite images that contain V*(N/V)=N pixels per frame, but now with a frame rate of MV, which can be much higher than the original frame rate, given V is large.

For example, a system can include k=54 micro-cameras in a camera array. For the image sensors having a number of pixels per sensor is N=20 million, with the original frame rate of M=20 frames per second, using a sub sampling factor of V=16, a faster frame rate VM=320 frames per second can be achieved. For the high frame rate, the image frames include a reduced number of pixel per image of N/V=1.25 million. With the camera array of 54 micro-cameras, the final stitched composite image can contain up to k*(N/V)= 67.5 million pixels, now with a higher frame rate of VM=320 frames per second.

In some embodiments, the system can be configured to incur minor delay in data transfer flow with the additional micro-cameras, due to the parallel processing from the micro-cameras. For example, since the micro-cameras in the camera array are sending image frames to the central processing station in multiple parallel data streams, the data flow rate can be similar for one or for multiple micro-cameras.

In some embodiments, an intermediate module can be disposed between the multiple cameras and the central processing station, for example, to organize the image data in the multiple data streams and to function as an interface for the central processing station, due to the different IO configurations between a standard central processing station, such as a standard computer, and the micro-cameras.

The intermediate module can be configured to accept multiple data streams 535 from the camera array, and can organize the image data, for example, to form data packets to send to the memory of the central processing station in a serial data packet stream 545. The intermediate module can include a chip set that can be configured to process multiple data streams in parallel, such as an FPGA, an ASIC, an ASSP, or a SoC. For example, an FPGA based module can offer flexibility in configuring to be the intermediate module.

With the FPGA based module capable of processing the multiple camera data streams in parallel, the data transfer rate from the multiple cameras to the FPGA based module can be similar for one or for multiple cameras.

Further, the FPGA based module can be configured so that the bandwidth, or data transfer rate, of the serial data stream 545 is greater than or equal to the combined bandwidths of the multiple parallel data streams 535, to avoid bottlenecking in data transfer flow from the cameras to the memory 541. For example, the serial data stream 545 can include a high speed data transfer interface with the number of data lanes designed to exceed the data transfer rates of all parallel data streams 535, such as PCIe-16 or PCIe-32. With matching bandwidths between the data transfer from the multiple cameras to the FPGA based module, and from the FPGA based module to the memory of the central processing station, the data transfer rate between the FPGA based module and the memory of the central processing station can be the same as the data transfer rate between the multiple cameras and the FPGA based module, e.g., the data transfer rate between the multiple cameras and the memory of the central processing station is not affected by the presence of the FPGA based module.

Further, the serial data stream can be configured to include small data packets, with each packet having only a portion of an image frame, such as a reduced image frame. The small data packets can enable rapid data flow, with minimum delays in data accumulation at the process module. Also, the serial data stream can be configured to send the data packets by direct memory access, e.g., without being processed by the processor 530, to further reduce delays in the data flow due to the processor.

Figure 6:
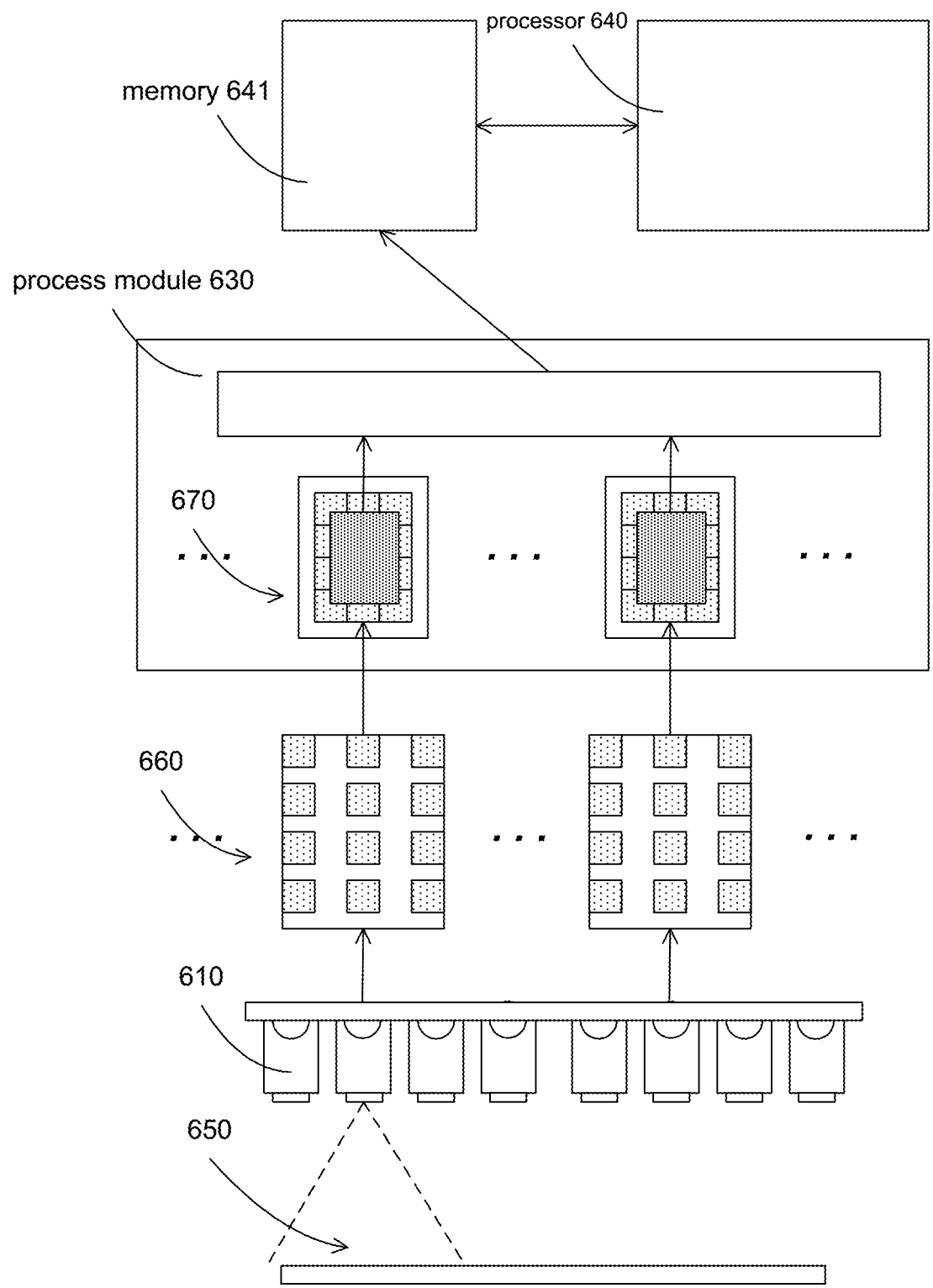
FIG. 6 illustrates a sub sampling process for an image compression process according to some embodiments.

FIG. 6 illustrates a sub sampling process for an image compression process according to some embodiments. In some embodiments, the image reduction process can include sub-sampled pixels (or binning pixels) from each image sensor, as well as pre-process these sub-sampled image pixels, to achieve an additional degree of data reduction. For example, multiple cameras 610 can be configured to capture images 650. The captured image data can be pre-processed to generate reduced size images, such as sub sampling or binning images 660. The images can be pre-processed to remove pixels having similar variation in intensities, or having small intensity variations, either on an image frame or on two or more subsequent image frames. The images can be compressed to form compressed images 670, either in the cameras or in the process module 630. In some embodiments, the cameras 610 can send multiple data streams to a process module 630, which can organize the data to send to a memory 641 associated with a processor 640 of a central processing station.

For example, the pre-processing process can remove pixels that have low variations in intensities, either in space or time. The removal of low intensity variations can be performed by spatial or temporal filtering via convolutions and removal of pixel values below certain thresholds, for example by spatial or temporal derivatives of the pixel intensities, either within an image frame or in two or more consecutive image frames. In some embodiments, the pre-processing process can include image compression, such as a JPEG-type compression. The compression process can be performed in a module integrated with the image sensor, or can be performed in the FPGA base module.

FIGS. 7A-7B illustrate flow charts for a system with large frames and high frame rates according to some embodiments. In FIG. 7A, operation 700 forms a computational microscope, with the microscope including a camera array having multiple cameras illuminated by one or more patterned illuminations from an illumination source. A camera of the camera array is configured to preprocess captured images to reduce sizes of the images before sending to a processor for analysis. The image reduction preprocess can be performed in the camera, e.g., integrated with the image sensor using hardware circuits to reduce delays in data transfer. The image reduction preprocess can be performed in a process module, outside the camera, in a hardware component configured to parallel processing the multiple data streams from the cameras. The size reduction can include at least one of a sub sampling process, a binning process, or a data compression process.

In FIG. 7B, operation 720 captures images by cameras of a camera array. Operation 730 processes the images to reduce sizes of the images, with the size reduction including at least one of a sub sampling process, a binning process, or a data compression process. The image reduction preprocess can be performed in the camera, e.g., integrated with the image sensor using hardware circuits to reduce delays in data transfer. Operation 740 sends the processed images, in multiple parallel data streams, to a process module for organizing into a data packet stream before reaching a computational system for image analysis.

Micro-Camera Array Microscope (MCAM) System

In some embodiments, the present invention discloses a system having parallel image data acquisition across an array of k separate image sensors and associated lenses, which can route data to another computer location or to memory at much higher rates. For example, for a set of sensors that each exhibit a maximum image data extraction rate D due to limitations of on-chip data routing, the parallel data transferring process for k image sensors can allow for extraction of image data at a rate kD.

In some embodiments, a parallel to serial module can be used to receive and process the parallel data transfer from the multiple image sensors. For example, the parallel to serial module can organize the received image data into a serial data packet stream, to send to a central processing station, such as sending directly to the memory of the central processing station through direct memory access. The parallel to serial module can simplify the central processing station, for example, by allow the use of a standard computer or a standard data processing system without the need for a central processing system with multiple specific interfaces for interfacing with the multiple image sensors.

At the same time, all current image sensors of any size exhibit a limited frame rate (i.e., the number of frames containing a set of N digitized pixel values from the sensor array per second). This limited frame rate is caused by a number of limitations, including a limited rate of information that can be read off of the sensor per second, a limited data transfer rate from off of the sensor to another location, and potential limits faced by heating or other effects, for example. At the present time, the currently available sensors suggests that the product of the maximum frame rate M of a sensor and the number of pixels N within each frame faces a practical upper bound D of approximately 1 Gigabyte/second (that is, MN<1 GB=D). There are exceptions to this limit, but in general, this limit is observed across many currently available CMOS sensors.

In some embodiments, the present invention discloses systems and methods to exceed this limitation to offer very large frames (N>10 MP or more) at high frame rates (>30 fps, and up to thousands of fps). The method parallelizes image data acquisition across an array of k separate sensors and associated lenses, which can provide large image frames with minimum decrease in data transfer rate. Together with an image size reduction for the captured image frames, the parallel array of k image sensors can produce large image frames at high frame rates.

In some embodiments, a k-parallel-image sensor system can be configured to obtain video images at a frame rate that is faster than standard video rates (30 or more frames per second), and with a very large number of image pixels per frame (over 20 megapixels, and up to 1 gigapixel or more). The system can use parallel image sensors to obtain large image frames, and can use an image reduction process to increase the image frame rate. Further, the system can be scalable and flexible, with the image frame sizes and the image frame rates determined by the need of a user, for example, by selecting the number of image sensors suitable for the desired image frame size, and by selecting the image reduction factors suitable for the desired image frame rate. The image reduction factor can also vary as a function of image sensor. For example, image sensors located towards the center of the array of image sensors can use a low reduction factor or no reduction factor to maintain a high pixel count, while image sensors located towards the edge of the array can use a large reduction factor to reduce the pixel count and thus provide a means to increase the full-frame video recording rate.

In some embodiments, the data transfer process can be applied to systems with multiple high volume data acquisition streams, such as to a computational microscope system of a micro-camera array microscope (MCAM) system. Details about the MCAM system can be found in patent application Ser. No. 16/066,065, filed on Jun. 26, 2018; and in patent application Ser. No. 17/092,177, filed on Nov. 6, 2020, entitled "Methods to detect image features from variably-illuminated images"; hereby incorporated by reference in their entirety, and briefly described below.

The MCAM system can be viewed as a group of multiple individual microscopes tiled together in an array to image a large sample. The individual microscopes can be configured into a micro camera package, e.g., forming a tightly packed array of micro-cameras with high resolution (1-10 μm) over a large area (hundreds of square centimeters). The images taken from the individual micro cameras, which include overlapped image patches of the sample, can be stitched together to form the image of the sample.

The MCAM system can include a programmable illumination system, such as a large array of light sources, with individual light sources or groups of light sources capable of being controlled separately, for example, by a controller. The light sources can be visible light sources, infrared light sources or ultraviolet light sources such as light emitting diodes (LEDs) or lasers with appropriate wavelengths. The illumination system can be placed below or above the sample, to provide transmissive or reflective light to the micro cameras.

The MCAM system can use multiple micro-cameras to capture light from multiple sample areas, with each micro camera capturing light from a sample area sequentially from multiple patterned illumination configurations provided on the same sample area.

The illumination system can provide the sample with different illumination configurations, which can allow the micro cameras to capture images of the sample with light incident upon the sample at different angles and wavelengths. The illumination angle and wavelength are important degrees of freedom that impacts specimen feature appearance. For example, by slightly changing the incident illumination angle, a standard image can be converted from a bright field image into a phase-contrast-type image or a dark field image, where the intensity relationship between the specimen and background is completely reversed.

Further, by providing the sample with different illumination light angles and wavelengths, both intensity and phase information of the imaged optical field can be recorded, which can allow the reconstruction of an image, for example, with more information or higher resolution. The MCAM system can offer size, weight, complexity, and cost advantages with respect to standard microscopes. The MCAM system may not require any moving parts, and its micro-cameras fit within a compact space without requiring a rigid support structure and can thus operate within a small, confined space.

In some embodiments, the microscope system can include camera units configured to pre-process the captured image data, for example, to perform image reduction based on a preset factor or on an instruction from a user. For example, a camera unit can include an integrated module configured to preprocess data captured by the image sensor. The integrated module can be configured to reduce delays in data transfer.

In some embodiments, the pre-processing process can reduce the size of the captured images by skipping pixels, by binning pixel intensities, by skipping pixels with small intensity variations in space or time, by compressing the image data, or by any combination thereof.

Figure 8:
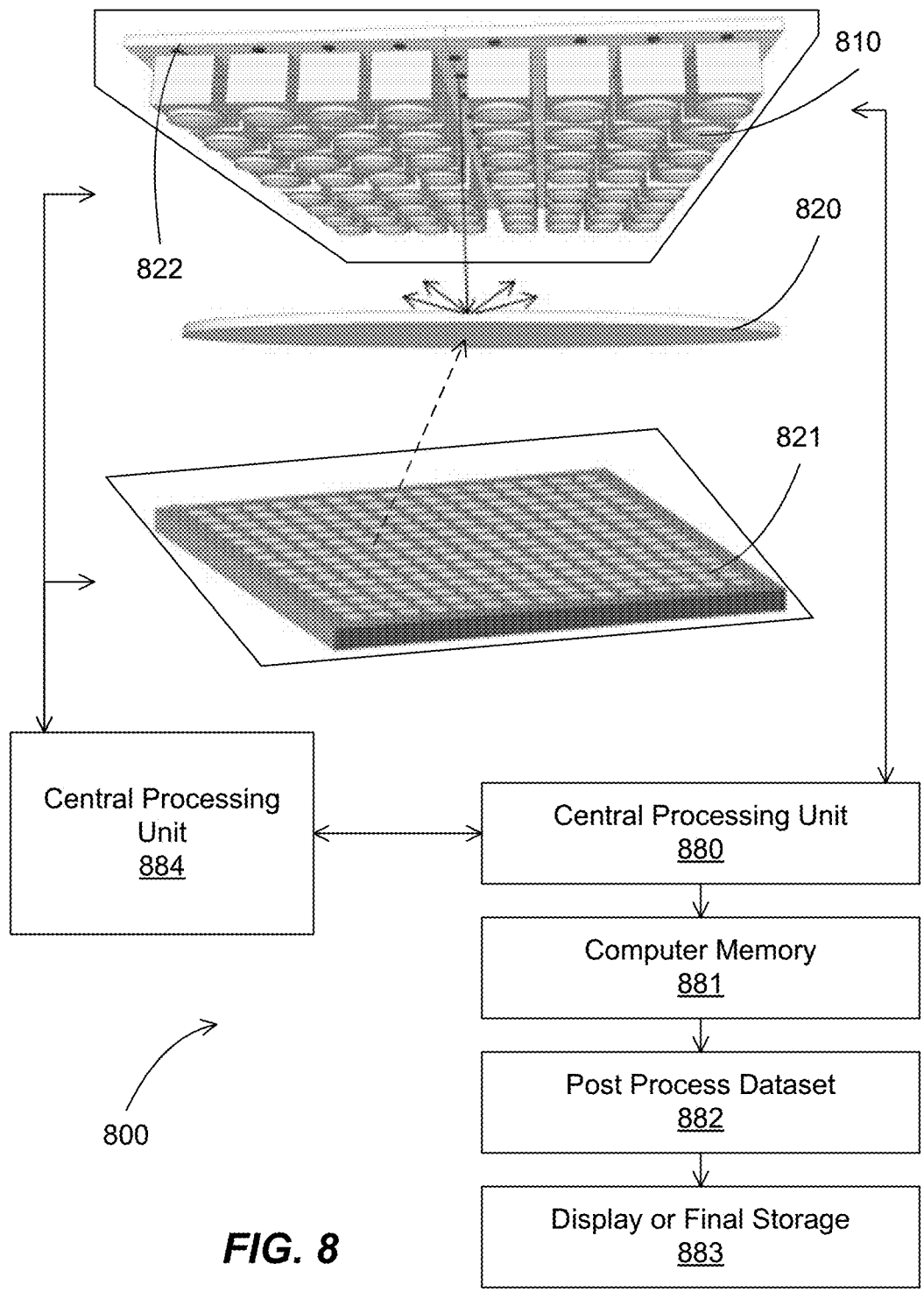
FIG. 8 illustrates a schematic microscope system according to some embodiments.

FIG. 8 illustrates a schematic microscope system according to some embodiments. The MCAM system 800 can include an array of camera units 810 and a patterned illumination source 821 and 822 for microscopic imaging. The camera units 810 are configured to image partially overlapping field of views (FOV) 811 of image areas of a sample 820. The patterned illumination source 821 and 822 can be configured to provide radiation, e.g., electromagnetic waves including visible light, infrared and ultraviolet light, on the sample 820 from a plurality of angles and spatial patterns, so that the spatial-angular distribution of radiation reaching the sample changes over time.

The illumination source can include a bottom set of radiation source units 821, a top set of radiation source units 822, or both bottom and top sets of radiation source units 821 and 822. The illumination source can provide illumination patterns to the sample 820 of the MCAM system 800, in which there is either a transmission illumination through the bottom set of radiation source units 821, or a reflection illumination through the top set of radiation source units 822, disposed near the micro cameras. The illumination source can also provide a dual illumination geometry, in which there are a transmission illumination through the bottom set of radiation source units 821, and a reflection illumination through the top set of radiation source units 822.

The illumination source can be configured to generate one or more illumination patterns. At each illumination pattern in the spatial-angular distribution of radiation generated from the illumination source 821 and 822, each camera unit can acquire an image. The set of images acquired from the camera units for the image areas for the illumination patterns can be processed to form an image reconstruction of the sample. The image reconstruction can also offer at least a measure of sample depth, spectral (i.e., color) properties, or the optical phase at the sample plane.

The MCAM system 800 can include a controller for controlling the camera units, the radiation source units, and for processing the images. For example, the controller can include a central processing units 880, which can couple to a camera and light controller units 884 for controlling the camera units, e.g., to tell the camera units when to capture images, and for controlling the radiation source units, e.g., to tell the radiation source units when to be activated and what radiation source units to be activated. The central processing unit 880 can be coupled with the camera units to obtain the image data captured by the camera units. The data can be stored in memory 881, can be processed in a post processing dataset 892, and can be displayed 883 on a display or to send to a final storage.

Figure 9A:
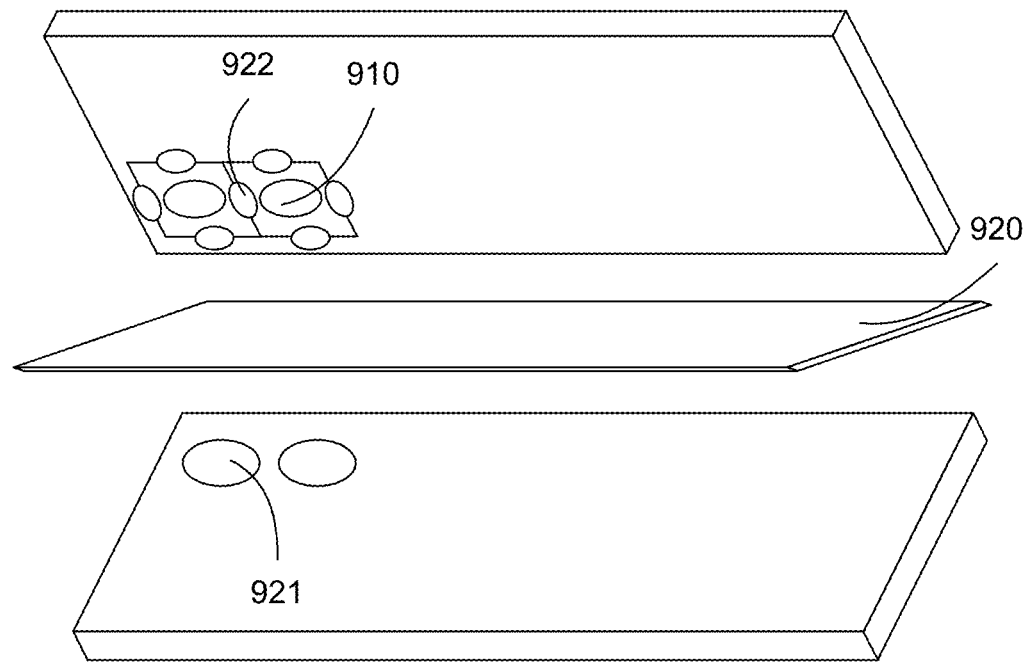
FIGS. 9A-9B illustrate a configuration for a microscope system according to some embodiments.
Figure 9B:
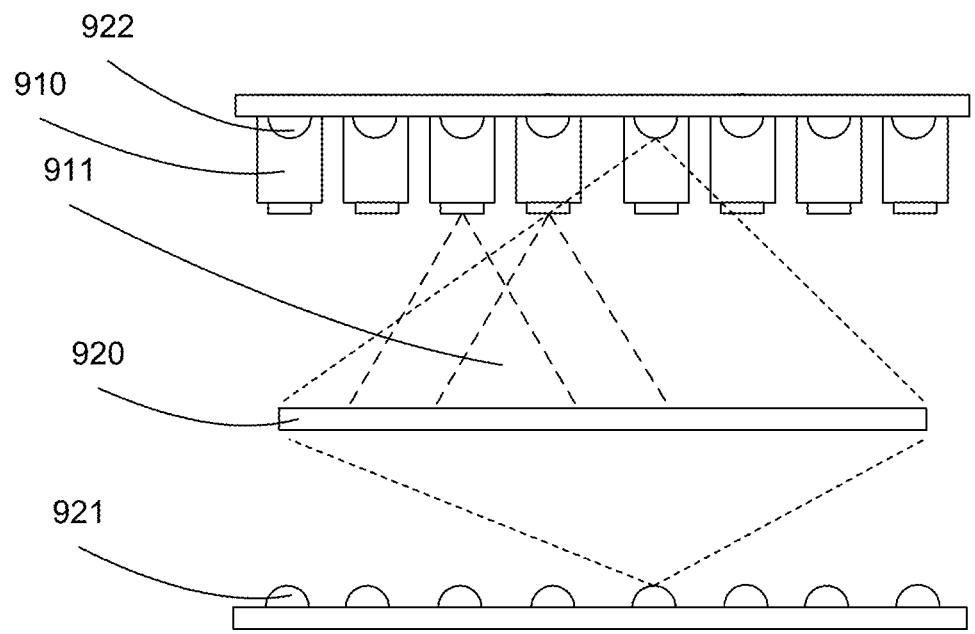

FIGS. 9A-9B illustrate a configuration for a microscope system according to some embodiments. FIG. 9A shows a perspective view and FIG. 9B shows a cross section view of a microscope system. The microscope system can include a camera array and an illumination source, which are controlled by one or more controllers, such as a camera controller, an illumination controller, and a system controller.

An MCAM system can include an array of camera units 910 focused on a large sample 920 under the illumination of an array of radiation source units 921 and 922 such as LEDs or other light sources. The camera units can be configured to pre-process the captured image data, for example, to perform image reduction based on a preset factor or set of preset factors or on an instruction from a user. A controller can be used to control the illumination system to provide variably illuminated radiation patterns, e.g., multiple illumination patterns with each pattern different from other patterns, to the sample.

Each micro-camera images a unique FOV of the object of interest, for example, a camera unit in the camera array can focus on a sample area, having overlapping areas 911 with nearby camera units to allow for image stitching and image fusing. Each camera can acquire multiple images under different illumination patterns. The captured images under one illumination pattern can be combined together via an image stitching algorithm, for example, to form a composite image that has a larger FOV that the FOV of just one of the micro-cameras individually. In some embodiments, the images from all of the k unique micro-cameras within the array may be stitched together to form a final composite image with a FOV that is approximately k times larger than the FOV of any of the individual micro-cameras. In some embodiments, the captured images under different illumination patterns can be fused together to form a high dimension image reconstruction of the sample.

The imaging process can start by capturing a set of images from multiple camera units in the camera array under an illuminated pattern. For example, the illumination pattern can include radiation from one or more radiation source units.

In some embodiments, to obtain high quality image reconstruction, the imaging process can capture k sets of variably-illuminated images from k illuminated patterns.

The variably illuminated radiation patterns include multiple illumination patterns in which the radiation is from different radiation source units. For example, an illumination pattern can include radiation from a single radiation source unit.

Thus, if the radiation source unit in an illumination source is activated one at a time, there can be k illumination patterns for an illumination source having k radiation source units. For example, an illumination source can have 50 radiation source units. When the radiation source unit is activated one at a time, there are 50 illumination patterns, with each pattern including radiation from a radiation source unit.

In some embodiments, different illumination patterns can be provided by a programmable array of radiation source units 921 and 922, with different radiation source units activated to emit radiation to the sample. Each radiation source unit can be configured to cover the whole sample, e.g., radiation from a radiation source unit can reach all areas of the sample. The programmable radiation source array can include radiation source units that are at different positions above or below the sample, as well as radiation source units that emit different frequencies (i.e., colors) of radiation. The radiation source units can include light emitting diodes (LEDs), individual lasers, laser diodes, spatial light modulators or other electronically controllable light emission elements.

The variably-illuminated images can be captured by a camera array, with each camera unit 910 in the camera array capturing an image. The camera array can include n camera units, with each camera unit configured to capture an area of the sample. Adjacent camera units can be configured to capture images having an overlapped area 911 images. The n camera units can be arranged to capture an image of the whole sample, having n overlapping images.

The camera units in the camera array are all activated at a same time for each illumination pattern to capture images. Thus, for each illumination pattern, there can be a set of n images. For example, a camera array can have 50 camera units. There is a set of 50 images captured under one illumination pattern. The set of images can be stitched together to form an assembled image of the sample.

Under k different illumination patterns, there can be k sets of assembled images, each captured under a different angle and spatial pattern. The image reconstruction of the sample, obtained by fusing the k sets of assembled images, can incorporate knowledge of the spatial-angular distribution of radiation reaching the sample. As such, the image reconstruction can offer a measure of sample depth, spectral properties, and the optical phase at the sample plane.

Figure 10:
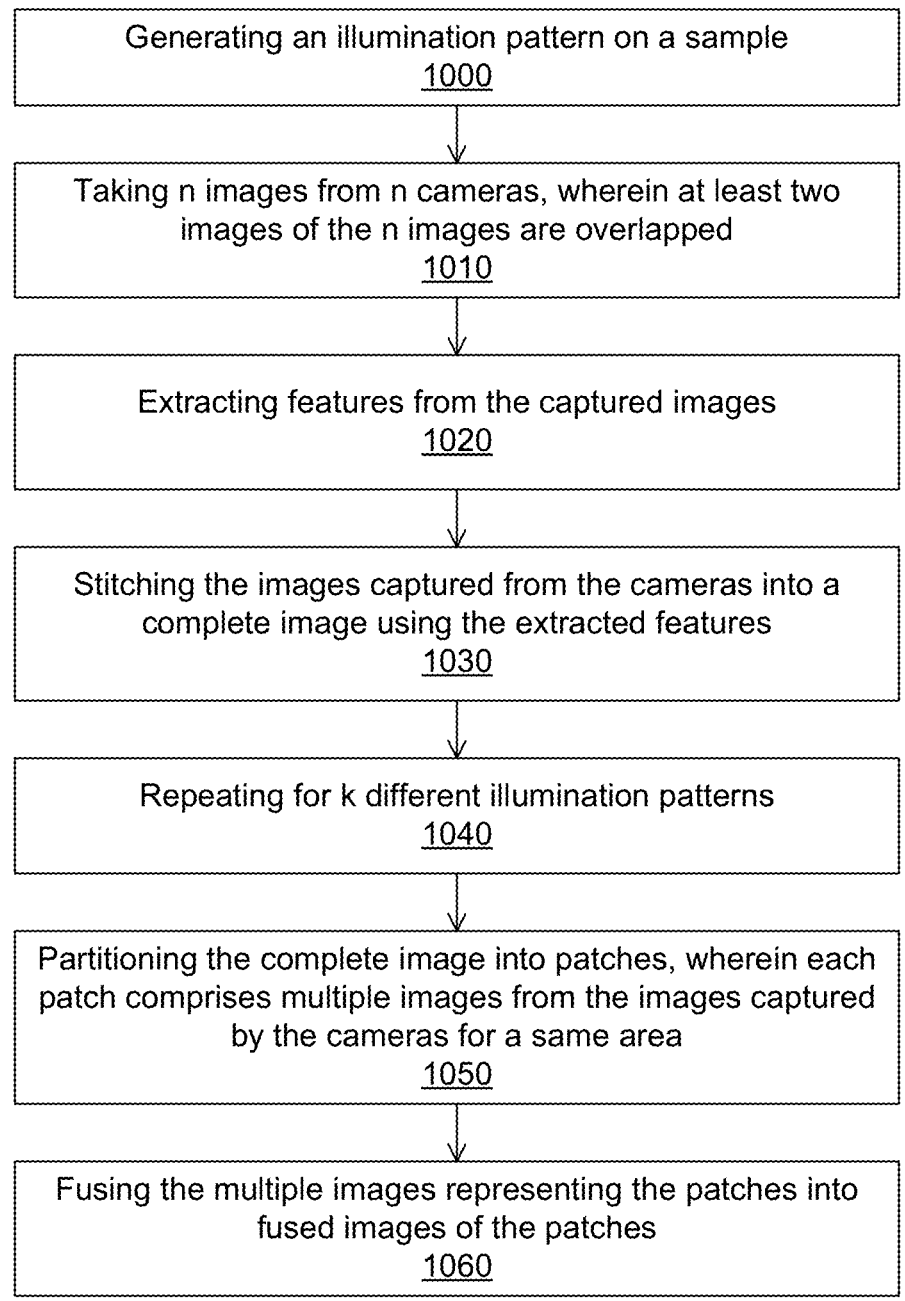
FIG. 10 illustrates a flow chart for operating a microscope system according to some embodiments.

FIG. 10 illustrates a flow chart for operating a microscope system according to some embodiments. The microscope system can include a camera array and an illumination source, which are controlled by one or more controllers, such as a camera controller, an illumination controller, and a system controller configured to process the images captured by the camera array under multiple illumination patterns generated by the illumination source. The camera units can be configured to pre-process the captured image data, for example, to perform image reduction based on a preset factor or on an instruction from a user. The image processing process can include a stitching process to stitch overlapped image areas to form an assembled image of the whole sample. The image processing process can include a fusing process to fuse a set of assembled images under multiple illumination patterns to form an image reconstruction of the sample.

Operation 1000 generates an illumination pattern on a sample. The illumination pattern can include radiation from one or more radiation source units from the illumination source. The illumination pattern can reach and interact with the sample, such as being partially or totally absorbed by the sample, being phase-shifted, phase-delayed or otherwise directionally altered by the sample, being dispersed by the sample, being transmitted or reflected by the sample, depending on the location of the light sources, being scattered by the sample, or a combination of two or more interactions, such as partially absorbed and partially transmitted.

Operation 1010 captures images from the camera units, for example, n images can be taken for a camera array having n camera units. The images can be overlapped, meaning adjacent cameras can capture some image data from a same image area (a spatially overlapping area from within the imaging plane or volume). The images can also be non-overlapped and observe different areas of the sample. Movement of the sample by a sample stage can be used to bring the sample into view at different micro-cameras while multiple images are acquired by each micro-camera, such that the entire sample area may be observed within the captured image data for subsequent processing. The cameras can be positioned so that the camera array covers the whole sample, e.g., all areas of the sample are captured by one or more camera units. The captured images can be resized or reduced, for example, by integrated modules in the camera units.

Operation 1020 extracts and describes features to form feature descriptors for the n images captured by the camera units under the illumination pattern. A feature can be described by a descriptor.

Operation 1030 stitches the images into an assembled image of the sample by matching the descriptors of the extracted features. For example, the feature descriptors in each image can be matched against feature descriptors in other images, and the images can be transformed to allow the overlapping of the matched descriptors to form an assembled image. After the stitching process, the assembled image can include n individual images captured by the n camera units under the illumination pattern.

A first step in the stitching process can include matching the identified descriptors in each image of the n captured images. The descriptors have been extracted and described for the features on each image. The matching of descriptors can allow the alignment of the images to form an assembled image. After matching the descriptors, the images can be aligned to form the assembled image.

The identification and matching of descriptors can be performed on multiple images, or alternatively, on individual images. For multiple images, two images can be stitched together, even though there are no matched features on the two images. The two images can be stitched together based on the matching of the descriptors, which can perform the alignment for all images.

An assembled image of the sample can be an image representing an area of interest on the sample. In some embodiments, the sample image can be considered as the image of the whole sample, since the whole sample is typically imaged. In some embodiments, only an area of interest on the sample is imaged.

The sample image can be large, e.g., larger than an image captured by a single camera of the camera array. Further, the sample image is configured, e.g., positioned in the microscope, in such as way so that the images captured by the camera array cover the area of interest on the sample, e.g., stitching the images captured by the camera array can allow the formation of a sample image.

Operation 1040 optionally repeats for a total of k different illumination patterns. The repetition process can include generating a different illumination pattern, taking n more images from the n camera units, optionally performing image reduction on one or more of the images to reduce the image size as desired, extracting features and stitching the images together to form another assembled image. The repetition process can continue until there are a total of k illumination patterns, e.g., when the number of illumination patterns reaches a predetermined number. The repetition process can also continue to capture video of dynamic samples that change or move as a function of time.

Each illumination pattern can be different and the set of illumination patterns can be configured to provide an increase in the amount of sample information to be captured by the cameras. After k illumination patterns, there can be a set of k assembled images, with each assembled image including n images captured by n camera units under an illumination pattern, stitched together.

Operation 1050 partitions the set of k assembled images into patches. The partition process can partition a sample image into multiple patches. Thus, the partition process can partition the set of assembled images into multiple sets of patches, with each patch in a set of patches being the same partitioned area in each sample image of the set of assembled images. The patch partition can be selected to simplify the reconstruction of fused images from the sets of patches.

Each set of patches can include multiple patches, with a patch being the area portion on a sample image of the set of sample images. A patch can be a portion of a sample image, which can be smaller than the image captured by a camera. Thus, an image captured by a camera can include one or more patches. A patch can be at an overlapped area between multiple cameras, and thus there can be multiple patches representing an area on the sample image that is captured by multiple cameras. For example, if the patch is at the overlapped area of 2 cameras, there are two patches in a sample images stitched together from all cameras for a particular illumination pattern. For k illumination patterns, a set of patches can include 2 k patches, for areas of the sample overlapped by two cameras.

Operation 1060 fuses the multiple patches in each set of patches into fused patches. For example, the patches in a set of patches can be fused together to form a fused image of the patch. The fusing process thus can produce a high resolution image for the patches.

Each set of k images from each camera can be fused, e.g., processed to combine into one image. Since each image of the set contains different information about the image area, such as the transmissive or reflective light data and the scattered light data from different light angles, images in the set can be processed to combine this information to a fused image carrying both intensity and phase information.

In the fusing process, a complex function S, e.g., having intensity and phase information, representing the sample area, can be determined from the set of k images. When an image of the sample area is captured by a camera, only the intensity is captured, e.g., the phase information is lost to the camera, and a 2D image is formed to represent the 3D sample with finite thickness. By taking a set of images of a sample under different illumination patterns representing light having unique spatio-angular distributions, each with an optical phase that can vary as a function of space, the phase information of the sample can be reconstructed to generate a representation of the 3D sample with finite thickness.

For example, the sample area represented by the set of k images can be described as a complex function S. The MCAM system can capture k images of the sample area, meaning the complex function S is transformed into a set of k images M through a system matrix T that describes the MCAM image formation process, which can determined from the geometry of the MCAM setup, including the light paths from the light sources to the camera.

$$M = \|T \cdot S\|^2 + n$$

The set of k images M is the result of the transformation of the system matrix M with the sample function S. Here, the absolute square term is due to the ability to detect only intensity by the camera, and n is an additive Gaussian noise.

The sample function S can be calculated from the above function by solving the inverse problem. A possible approach for the inverse problem is to minimize the mean-squared error between the measured magnitudes and an estimate of the sample function. Another possible approach is to minimize a related negative log-likelihood function, which is based on a Poisson noise prior. Another possible approach is to treat the problem as a cost function, using appropriate minimization algorithms, such as a Douglas-Rachford algorithm.

In some embodiments, an approach for the inverse problem is to solve the minimization problem by constructing an Augmented Lagrangian and then minimizing the Augmented Lagrangian with gradient descent. In some embodiments, the inverse problem can be solved using an iterative optimization strategy that first determines the gradients, or the gradients and the Hessians, and then applying a Gauss-Newton method. In some embodiments, the sample may be fluorescent and function S can be a real, positive-valued function, and a minimization method similar to those used in structured illumination fluorescent microscopes to determine a high-resolution sample can be used. In some embodiments, an approach for the inverse problem is to use a neural network, such as a convolutional neural network or a deep neural network, either trained or untrained, to transform the measured data into The image reconstructions process can also include an estimate of the sample height, the sample phase, and its spectral color content.

The fused patches can then be assembled to produce a final, large, high-resolution image reconstruction of the sample. The final image can include a measurement of depth at different spatial locations across the image. The final image can include a measurement of the optical phase at different spatial locations across the image. The final image can include a measurement of multi-spectral content at different spatial locations across the image.

Figure 11:
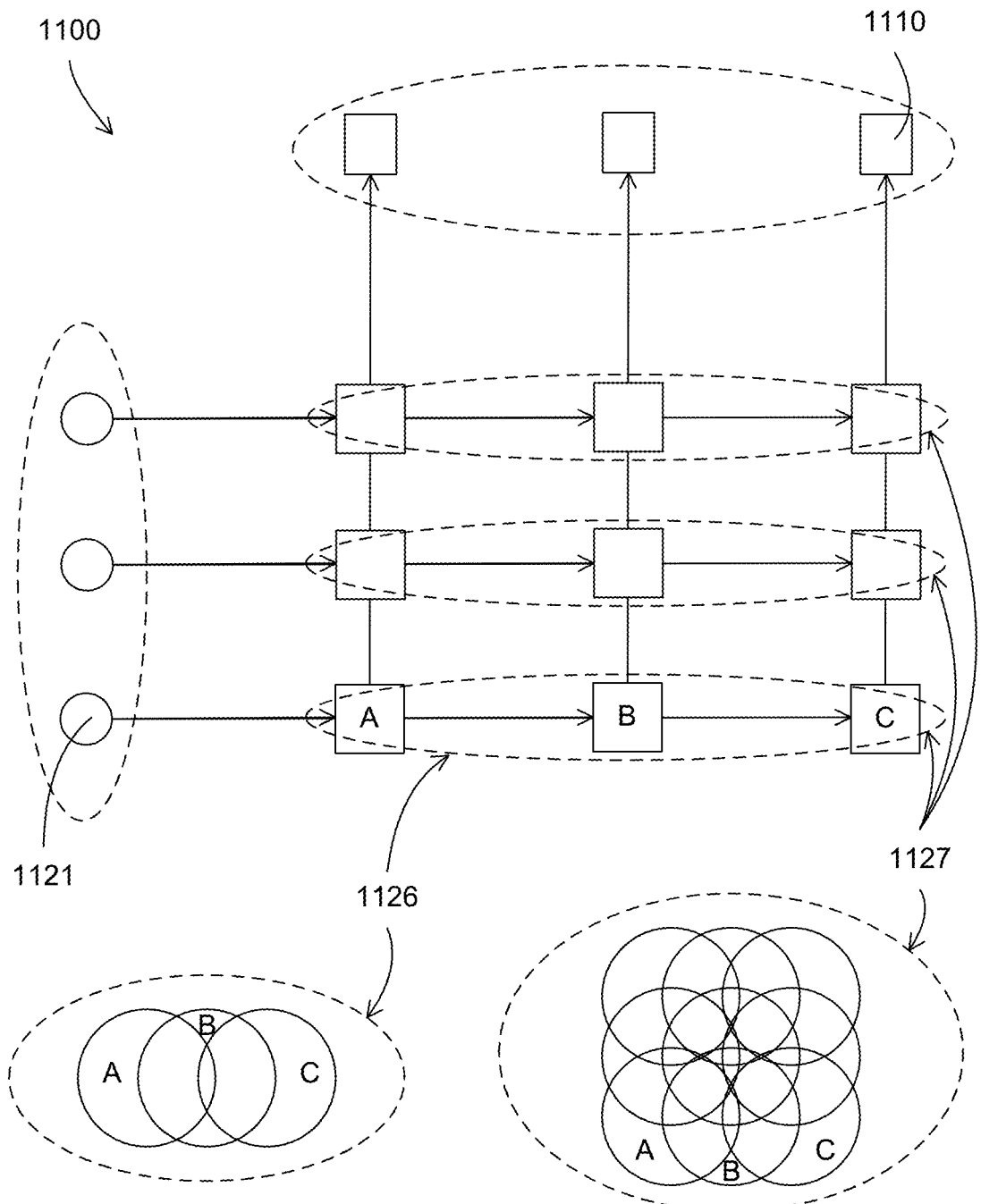
FIG. 11 illustrates an operation schematic of a microscope system according to some embodiments.

FIG. 11 illustrates an operation schematic of a microscope system according to some embodiments. A microscope system 1100 can have illumination sources 1121 and camera units 1110 for capturing images of portions of a sample. As shown, the illumination source 1121 can include k=3 radiation source units, and the camera units 1110 can include n=3 camera units.

In some embodiments, each radiation source unit is configured to cover the whole sample. Each camera unit is configured to capture images of a portion of the sample. Further, a camera unit captures only images corresponding to a matching radiation source unit. For example, radiation source unit 1121 can irradiate the whole sample. All camera units, such as camera unit 1110, can capture images A, B, and C of overlapped portions of the sample. Thus, the images A, B, and C captured by n=3 camera units 1110 can be assembled, such as stitching together, to form an assembled image 1126, e.g., a complete image of the sample, under the illumination of the radiation source unit 1121. Thus, under one illumination pattern generated by a radiation source unit 1121, a complete image of the sample can be captured. The process can be repeated for the k=3 radiation source units to form a set of images 1127.

In some embodiments, the present invention discloses systems and methods of imaging for high frames and high frame rates by using an array of multiple small microscopes (i.e., micro-cameras), tiled together in an array. Using preprocessing modules, such as integrated with image sensors in the micro-cameras, an image reduction process can be performed, resulting in high fame rates without affecting the data transfer process. Using a tightly packed array of micro-cameras having high resolution (1-10 µm) over a large area (up to hundreds of square centimeters), large frames with high pixel counts can be achieved. By configuring the camera array to transmit image data in multiple parallel data streams, the data transfer rate can be minimally affected.

The radiation from different illumination patterns can provide radiation with different path lengths to the sample, so that each point on the sample can receive radiation with multiple path lengths. The different path lengths can allow the reconstruction of phase information using intensity information from the multiple path length radiation. The different illumination patterns can enable image reconstruction of the sample, e.g., images with higher quality such as having depth measurements or higher resolution. The system can be versatile, providing large image frames, high frame rates, or high image quality, for example, through an optimization of number of cameras, image reduction process or factors, or number of illumination patterns.

The camera array can include multiple camera units disposed above the sample. A camera unit can include a camera, e.g., an optical sensor capable of capturing images due to radiation in a wavelength range, such as images caused by visible light, infrared light, or ultraviolet light. The camera unit can include a pre-processing module, which is configured to perform image reduction when reading pixel data from the image sensor. The camera unit can be configured to receive instructions from a user, such as through a central processing station, with the instructions including image parameters and image reduction factors, for configuring the camera unit.

The camera units are positioned so that each camera unit is configured to capture images of an area of the sample, e.g., different camera units are configured to capture images of different areas. The areas captured by different camera units can be partially overlapped, e.g., adjacent camera units can have an overlapped field of view. The overlapped field of view can be greater than 50% for image reconstruction (e.g., phase calculation for the captured images), or can be less than 50% for image stitching (e.g., matching features for assembling a larger image from smaller images). The multiple camera units with overlapped field of view can allow the microscope system to capture images of large sample, by stitching and assembling images of portions of the sample.

The controller can be configured to control the camera units to capture images from the sample under each illumination pattern from the illumination source. By capturing images from multiple different illumination patterns, phase information can be reconstructed from the multiple captures intensity-only images. With a large overlapped field of view, such as greater than 50%, the image reconstruction process can be reliable and can provide an image reconstruction with additional information of the sample such as depth information.

After multiple illumination patterns, the system can have multiple assembled images, with each assembled image including multiple images captured by the camera units under one illumination pattern and stitched together. The assembled images can be fused together, e.g., having underwent an image reconstruction process, to form an image reconstruction of the sample, which carries more information than the individual assembled images, such as having phase information in addition to intensity information. Thus, the controller can be configured to use a fusing algorithm based on overlapped field of views of two adjacent camera units.

In some embodiments, the camera units can be arranged in one or more periodic arrays, for example, separated by a gap between the arrays to accommodate the radiation source units. The individual camera units can be disposed uniformly or evenly in the periodic arrays.

Figure 12A:
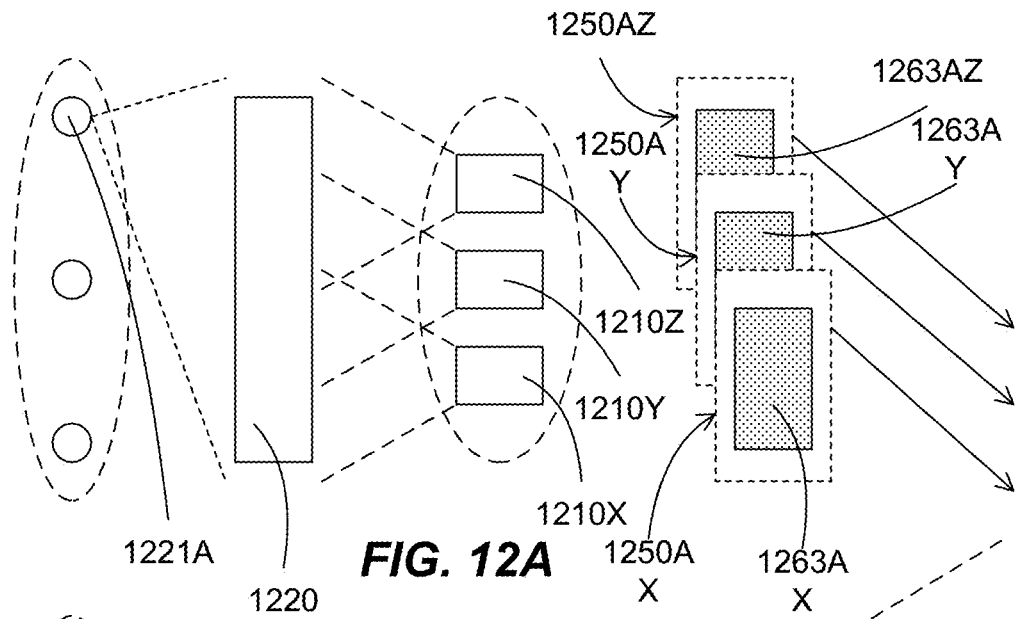
FIGS. 12A-12C illustrate a sequence of data flow from a camera array according to some embodiments.
Figure 12B:
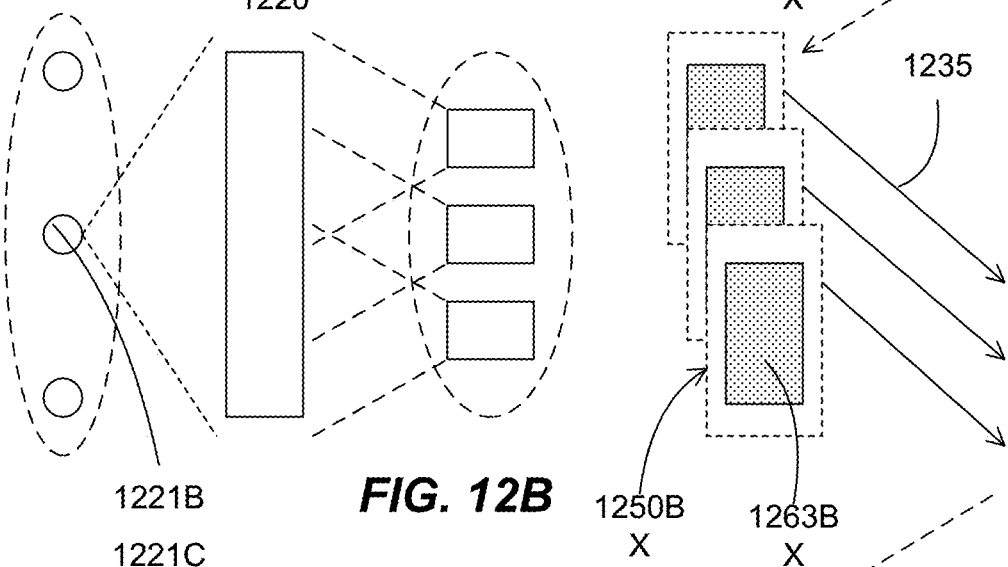
Figure 12C:
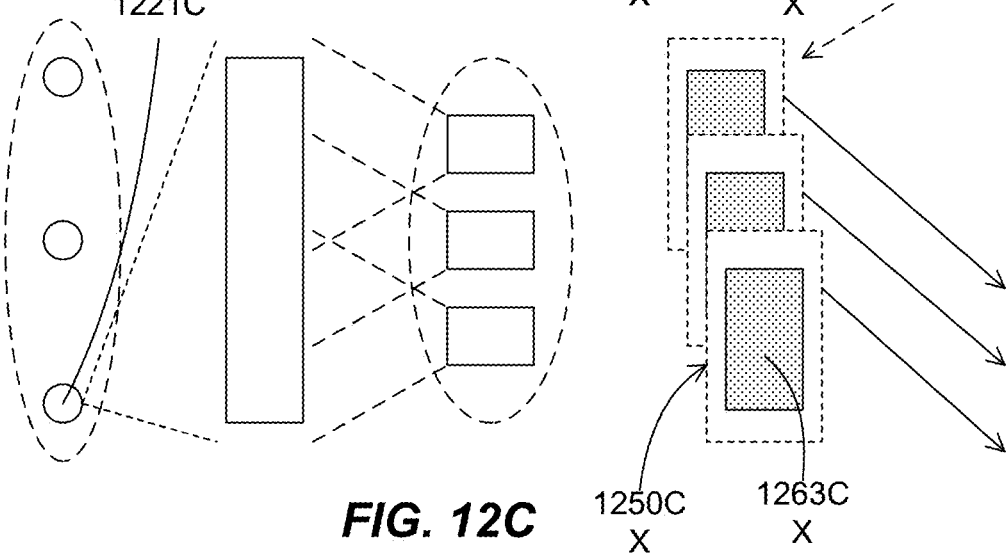

FIGS. 12A-12C illustrate a sequence of data flow from a camera array according to some embodiments. The sequence represents the multiple capabilities of a system, such as a microscope system, having a camera array 1210X, 1210Y, and 1210Z with image reduction ability, and an illumination source having radiation sources 1221A, 1221B, and 1221C.

In FIG. 12A, radiation source unit 1221A can shine light on a sample 1220. The radiation source unit 1221A is configured to cover the whole sample, or at least the portion of interest in the sample. Under the illumination pattern generated by the radiation source unit 1221A, each camera 1210X, 1210Y, and 1210Z of the camera array can capture an image, such as images 1250AX, 1250AY, and 1250AZ, respectively. The captured images can be pre-processed, under an image setting of the cameras, for example, to perform image reduction, using a reduction process such as filtering, sub sampling (e.g., skipping pixels), binning (e.g., averaging pixel intensities in bins), gradient cutoff (e.g., removing pixels having low spatial or temporal gradient), or compression. The resized images 1263AX, 1263AY, and 1263AZ, preprocessed from the captured images 1250AX, 1250AY, and 1250AZ, respectively, can be sent in multiple parallel data streams to a process module or to a central processing station.

In FIG. 12B, the process can be repeated for another illumination pattern, such as an illumination pattern generated by radiation source unit 1221B. The cameras 1210X, 1210Y, and 1210Z can capture images under the new illumination pattern, such as image 1250BX captured by camera 1210X. The captured images can be preprocessed to form reduced images, such as image 1263BX reduced from captured image 1250BX.

In FIG. 12C, the process can be repeated for another illumination pattern, such as an illumination pattern generated by radiation source unit 1221C. The cameras 1210X, 1210Y, and 1210Z can capture images under the new illumination pattern, such as image 1250CX captured by camera 1210X. The captured images can be preprocessed to form reduced images, such as image 1263CX reduced from captured image 1250CX.

The multiple illumination patterns can form multiple parallel data streams 1235 from multiple cameras, with each data stream having a sequence of reduced images captured under the series of illumination patterns.

In some embodiments, the system can be configured to vary the number of illumination patterns and the image reduction parameters to obtain a desired image quality and a desired frame rate. For high image qualities, the number of illumination patterns can be high. For high frame rates, the image reduction factor can be high, such as having a low sub sampling value. For example, using 1 illumination pattern, a standard quality image can be obtained, with a frame rate of 6 frames per second to create a video with 6 frames per second. Using 24 illumination patterns, a high quality image reconstruction can be obtained, providing depth measurements and resolutions exceeding the diffraction limit. However, the frame rate can be low, e.g., reduced by a factor of 24, for 4 seconds per effective frame. Note that the 24 illumination patterns can be shown in a repeated manner to produce subsequent effective frames at a rate of 4 seconds per effective frame. Using an image reduction method such as sub sampling at a rate of $1/16$, e.g., one pixel saved for 15 pixels skipped in a 4×4 sub sampling pattern, the frame rate can increase by a factor of 16, for 4 effective frames per second frame rate, in the case of high quality image reconstruction.

Figure 13:
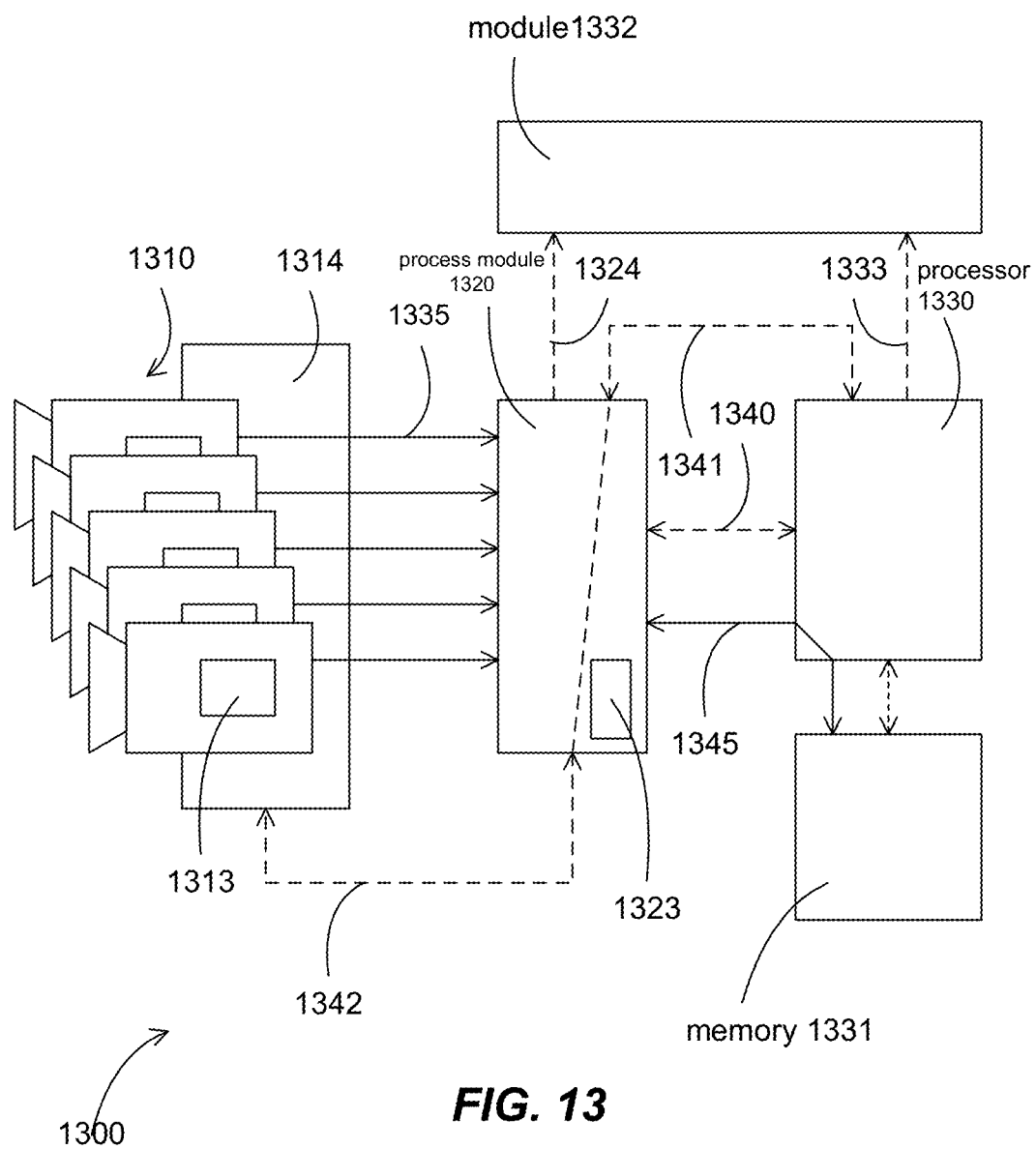
FIG. 13 illustrates a microscope system configured with an image reduction capability according to some embodiments.

FIG. 13 illustrates a microscope system configured with an image reduction capability according to some embodiments. A microscope system 1300 can include a camera array 1310, which includes multiple camera units. A clock generator 1314 can be used to generate a common clock signal, such as a 25 MHz clock signal, to all camera units, for example, through clock buffers. The camera units can have preprocessed modules 1313, which can be configured to preprocess the image data when reading from the image sensors of the camera units. The preprocess modules can perform an image reduction process, such as sub sampling with optional filtering, binning with optional filtering, low intensity pixel gradient removal (e.g., calculating intensity spatial or temporal gradient for the pixels, such as through a derivative calculation or one or more convolution operations with different convolution filters, and removing pixels having resulting values below a threshold value), data compression, or any combination thereof. The image reduction process can be triggered with specified processes and reduction factors through inputs 1342 from a user, such as through a process module 1320 or through a computational unit. The reduced images can be sent, in multiple parallel data streams 1335, to a process module 1320, which is configured to organize the image data. The multiple parallel data streams can significantly reduce the transfer time of the captured and reduced images from the camera units to the process module 1320. For example, through a common clock with similar image parameters, the multiple data streams can have minimum variation in timing, which can allow the process module to receive multiple data streams in the same time as receiving one data stream.

A process module 1320, such as an FPGA based module (e.g., a module containing a processing chipset, such as an FPGA, or other chipset of an ASIC, an ASSP, or a SOC), can be configured to receive image data from the multiple camera units, e.g., through data streams 1335, which use a high speed serial communication link for each camera unit. The FPGA based module 1320 can include a shallow buffer 1323, for example, to store incoming data from the data streams 1311. The FPGA based module can be configured to send 1342 sensor configuration data to the camera array, for example, to provide image parameters to the image sensors of the camera units. The sensor configuration can be received from a computational unit having a processor 1330 and a memory 1331, for example, through communication 1341. For example, the processor can send configuration and settings to the FPGA based module, with the configuration and settings including setting information for the FPGA based module and the configurations for the image sensors. The FPGA based module can communicate 1345 with the computational unit using direct memory access (DMA) to pass data directly to the memory 1331, through a high speed link such as PCIe. The FPGA based module can communicate 1324 with a module 1332, which can be configured to control lighting, motion, and sample handling for the microscope system. The computational unit 1330 can also communicate directly 1333 to the module 1332. The computational unit 1330 can communicate with a storage or network devices (not shown). The system can include peripheral devices, such as stages, illumination units, or other equipment involved in the apparatus necessary to ensure adequate imaging conditions.

The microscope system 1300 can be configured to minimize the delay in analyzing the data captured by a multi-sensor array 1310 in the microscope, such as from the time an operator defines the microscope's dynamic settings to the time the acquired images are analyzed. The microscope is configured to capture multiple images simultaneously from multiple image sensors, and thus can generate gigabytes of image data per second, with each snapshot containing a few hundred megabytes of data. With minimum delay time in the data transfer process, a computational unit having a processor in the microscope system can obtain high frame rates for the captured images, which can allow an observation of fast moving or fast reacting organisms.

In some embodiments, the microscope system with minimum data transfer delay can be constructed through a combined design of electronic hardware, firmware and analysis software on the processor of the microscope system. For example, multiple image sensors can be placed on a single printed circuit board and share a common clock 1314 that is used to provide the multiple image sensors with common clock buffers, a common frame rate and imaging parameters. The data from the image sensors can be send in multiple parallel data streams to a process module 1320, such as an FPGA, ASIC, ASSP, or SOC based module for data aggregation and preparation before sending to a memory 1331 associated with the processor 1330 of the microscope system for data analysis. The FPGA based module can also be configured to perform direct writing 1345 to the memory without using processing time from the processor, which can ensure that the image data acquired from the multiple image sensors is not lost while the CPU is busy analyzing data and cannot receive data from the sensors. Furthermore, the FPGA based module can enable the processor to be connected to many image sensors without the need for a custom processor design, since processor I/O are often designed for specific very high speed communication standards, while image sensors may require completely different communication protocols.

In some embodiments, the data flow is configured in adequate packet sizes, which are designed to be efficiently transferred to a computational unit. Further, for the stored data to be efficiently utilized by the processor, such as a central processing unit (CPU), or other computational unit such as a graphical processing unit (GPU), data for each image must be stored in contiguous memory on the memory associated with the processor.

In some embodiments, the multiple data streams from the camera units are organized in a serial data packet stream to send to the memory of the computational unit, for example, by an FPGA based module. It is an innovative feature of the data flow architecture that the incoming data stream to the memory of the computational unit contains a sequence of data packets in the size of a partial image frame, e.g., a small portion of a full or reduced image frame data, such as a data packet size that is 0.01% to 1%, 0.05% to 0.5%, 0.02% to 0.4%, or 0.1% to 0.2% of a full or reduced image. For example, an image sensor can have 4096×3100 pixels, with each pixel measuring one byte of data per frame. A data packet size can be chosen to include one line of the pixel size, e.g., 4096 bytes, for 1/3100 times smaller than a full image data. A data packet size can be chosen to include two lines of the pixel size, e.g., 2×4096 bytes, for 1/1550 times smaller than a full image data. A data packet size can be chosen to include four lines of the pixel size, e.g., 4×4096 bytes, for 1/775 times smaller than a full image data. For reduced images, such as image reduced by a factor of 16, the data packet size can still be selected to be 4096 bytes, which translates into 4 lines of a reduced image size, such that the reduced image size has 1024×775 pixels.

In the small data packet architecture, e.g., the size of a data packet is less than 0.5% of a full image size, the FPGA based module configured to reorganize the multiple incoming data streams from the multiple camera units into a data packet stream can only need to store one or two data packets from each data stream of the camera unit, such as a few multiples of 4096 bytes of data, for image sensors having a 4096×3100 pixel size.

The small data packets can be critical in the flow of data from multiple parallel data streams from multiple camera units to the memory of the computational unit. The FPGA based module can configured and organize the image data into small partial image frames, e.g., data packets, and transfer the partial image frames to the memory so that the partial image frames are available to the processor. With the processor configured to process and analyze the partial image frames, instead of waiting for full image frame data, the responses from the processor can be thousands of times faster, since the partial image frames can be thousands of times smaller, and thus can arrive thousands of times faster.

An advantage of the data flow architecture using small data packets is that image data, actually data for partial image frames, can be available for the processor to analyze with minimum delays after the images are acquired by the camera units. With the partial image frames thousands of times smaller than full image frames, the image flow from the image sensors to the processor can also be thousands of times faster. The fast data flow can enable the processor to start analyzing the image data, e.g., the first portion of the images, before the full images have completed the transfer process, and thus can allow the processor to change the image parameters of the image sensors before the acquisition of next images.

Also the ability to start analyzing images, e.g., partial image frames, immediately as the image being captured and data coming out of the image sensors can avoid the dead time between image acquisition, processing and imaging parameter selection. For example, changing the illumination, sample position, or other environmental parameters can often be a slow process and ensuring that the new imaging parameters are quickly identified is an important factor to reducing the total imaging time of an experiment.

In addition, the fast data flow which allow the availability of image data, e.g., partial image frames, with minimal delays after the images, e.g., full image frames, being captured can be critical for many applications in microscopy where decisions must be made depending on the observed measurements from a sample, such as in biological applications with stimuli applied to a model organism to understand the behavior of the organism under different scenarios. The fast data flow process can allow the processor to quickly change 1325 the observed parameters, e.g., the imaging parameters of the sensors or accompanying hardware, such as the illumination, sample stage, sample temperature, etc., to best observe the organism behavior.

In some embodiments, after an image acquisition is triggered 1342, with information relating to image reduction, either by continuous acquisition, or an event of interest, data from each image sensor begins to arrive continuously in time, from all image sensors at the same time. To avoid lengthy delays, the receiving module, e.g., the FPGA based module, can create small data packets that can be efficiently transmitted to the memory. Various different packet sizes are suitable, but a packet size of 4096 bytes (0×1000 in hexadecimal representation) is particularly interesting since it aligns well with a page of memory on the computational unit. For image sensors with a row size of 4096 pixels, when the image is transmitted with 8 bits per pixel, this one page of memory on a computer corresponds to one row of data from an image sensor. For image sensors with different sizes, or for reduced image sizes, 4096 bytes can correspond to partial rows of data from the image sensor, or multiple rows of a sensor. A key design parameter is that the FPGA can gather multiple such packets simultaneously from the different image sensors. After receiving enough data in each of the different image sensors, the data packets can be reordered in time, in a round-robin fashion, so that they are transmitted one after the other to a high speed communication output link 1345 to the memory. Data packets in the high speed communication link can be sent to the appropriate location in the computer memory where it can then be analyzed, stored, or forwarded to another computer, by the end user application.

In some embodiments, the data flow of a sequence of data packets each containing a partial image frame can be formed by an FPGA based module having a small data buffer 1323. For example, the FPGA based module can store a small partial image frame, such as multiples of a line of data n an image sensor, from each image sensor. The partial image frame data flow can lower the cost of the FPGA based module, by requiring small buffer size FPGA based module. For example, in a system having 54 image sensors of 4096×3100 pixel size, with each pixel stored in a byte of data, full image frames for the 54 image sensors can require almost 700 Mbytes of data for a buffer in a FPGA based module. Using the partial image frame data flow, with each partial image frame having 4 lines of image data, the partial image frames for 54 image sensors can require less than 1 Mbytes, which can be easily achievable, as compared to the 700 Mbytes requirement. Further, 700 Mbytes of buffer space requires dedicated hardware to ensure this large buffer space, increasing the size, cost, and complexity of the hardware design.

In some embodiments, the data flow can accommodate a large number of image sensors, e.g., a large number of parallel data streams from a camera array, based on the small size of the partial images. As discussed above, a one-Mbyte FPGA based module can accommodate 54 image sensors. FPGA based modules with higher buffer sizes, such as multiples of 1 Mbyte sizes, can accommodate multiples of 54 image sensors.

In some embodiments, the FPGA based module is configured to receive data, e.g., full images or reduced images depending on image reduction instructions, from multiple data streams from multiple camera units, and then reorganize the received data on the fly, to generate an output stream of data packets to be sent to appropriate locations in the memory associated with the processor. To minimizing delays, the FPGA based module can send the data packets directly to the memory locations, bypassing the need for any involvement of the processor. The direct memory writing can be accomplished by a direct memory access feature on the computational unit, with the FPGA based module using a communication link that support direct memory access (DMA) together with having an appropriate DMA engine capable of writing the data packets to the appropriate locations on the memory.

Further, the FPGA based module also needs to know the memory locations to send the data packets. Thus, during the system set up phase, the processor can send 1340 descriptors of the locations of the memory, e.g., the RAM associated with the processor, to the FPGA based module. The processor can send 1324 set up information to a configuration and setting module 1332, with the FPGA based module responsible for trigger and synchronization 1342. For example, once the imaging parameters are defined, such as frame rate, image size, triggering conditions, number of cameras used, exposure time, digital gain, analog gain, number of frames to be acquired, and image reduction information, the processor can provide the memory addresses where each image must be stored. The location of these addresses is designed such that each image will be located contiguously in the memory to ensure efficient computation and subsequent analysis. The FPGA based module and the computational unit can be configured to allow the FPGA based module to send data packets to the memory of the computational unit without requiring any additional memory copies from the computational unit.

In some embodiments, the location descriptors, such as the starting addresses or links to the starting addresses, of the memory can be incorporated in the data packets, so that each data packet can be sent to the appropriate memory locations. The FPGA based module can communicate with the computational unit through an interface that supports direct memory access, which can require hardware support from the computational unit, and can require a link that support direct memory access, such as PCIe or similar interfaces. The direct memory access feature can enable the FPGA based module to control the destination of the large quantities of data packets that are transmitted to the memory of the computational unit.

After organize the data packets from the multiple parallel incoming data streams from the camera array, the FPGA based module can communicate directly with the memory, freeing the processor for other tasks such as processing or analyzing image data. Direct memory access can avoid multiple copies of the data formed between the operating system kernel, which can limit control to the external hardware and the end user application that lives in an isolated environment outside of kernel memory. The direct memory access can prevent loss of data, due to an efficient and predictable memory writing process. With direct memory access, the FPGA based module can ensure that data packets containing partial image frames of the images captured by the camera units can arrive at their respective locations in the memory. For optimal computation speed, the memory can reserve a series of addresses that contain the starting locations of the N*M buffers (where N is the number of image sensors and M is the number of images to capture per sensor), each large enough to store a single image. In addition, for efficient direct memory access, the data packet size is optimized to the operating system boundaries, such as integer multiples of 4096 bytes.

In some embodiments, the FPGA based module can be configured to have match bandwidths between the outgoing data packet stream to the memory and the multiple incoming streams from the camera units. For example, the data output interface, which is the communication link between the FPGA based module and computational unit, can match with or have greater than, in terms of aggregate data throughput, the data input interfaces, which are the communication links between the FPGA based module and multiple camera units. The communication links and the number of lanes for the communication links can be selected to make sure that there is no data bottlenecking in transferring data packets to the memory.

Benefits of the data flow architecture and the microscope systems incorporating the data flow architecture, can include a new ability to rapidly record high-resolution microscopy imagery over a very large field of view, in addition to high image frame rates, using a multitude of micro-cameras while minimizing the memory requirements on the data gathering FPGA based module. This new capability opens up new directions for scientific discovery—allowing for image snapshots or videos of large area that may contain a variety of samples including but not exclusive to freely moving organisms over more than just several square centimeters while simultaneously changing their stimuli or imaging environment. It also provides a more efficient manner to obtain large data volumes from large, flat objects (e.g., semiconductor wafers, sheets of glass, plastic components) while their imaging environment is adapted to the recorded images or partial images.

Figures 14A, 14B:
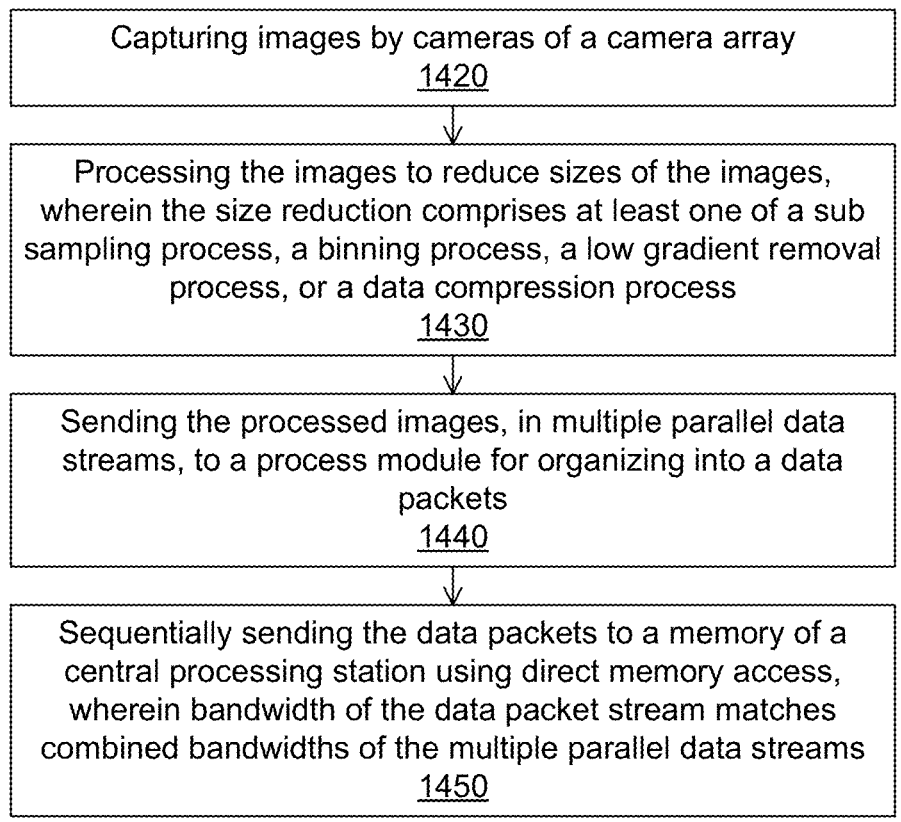
FIGS. 14A-14B illustrate flow charts for forming microscope systems according to some embodiments.

FIGS. 14A-14B illustrate flow charts for forming microscope systems according to some embodiments. In FIG. 14A, operation 1400 forms a computational multi-camera system, with the system including a process module configured to organize data received, in parallel, from multiple cameras of a camera array into a sequence of data packets to send to memory of the system. Each camera can be configured to preprocess captured images to reduce sizes of the images. Each data packet can include a portion of a reduced image. Bandwidth of the data packet sequence to the memory can be greater than or equal to combined bandwidths of the multiple parallel data from the multiple cameras. The process module can be configured to send the data packets directly to the memory without using a processor of the computational system.

In FIG. 14B, operation 1420 captures images by cameras of a camera array. Operation 1430 processes the images to reduce sizes of the images, with the size reduction including at least one of a sub sampling process, a binning process, a low gradient removal process, or a data compression process. Operation 1440 sends the processed images, in multiple parallel data streams, to a process module for organizing into a data packets. Operation 1450 sequentially sends the data packets to a memory of a central processing station using direct memory access, with bandwidth of the data packet stream matching combined bandwidths of the multiple parallel data streams.

Correlation with Image Frame Rates

In some embodiments, the system, such as a microscope system, can offer large frames (through multiple camera units in a camera array), together with image reduction ability for high frame rates (through a preprocess modules incorporated with the camera units) and variably illumination patterns for high quality images (through an illumination source offering different illumination patterns). In addition, the system can offer image optimization based on a selection of image reduction parameters and numbers of illumination patterns.

Figure 15:
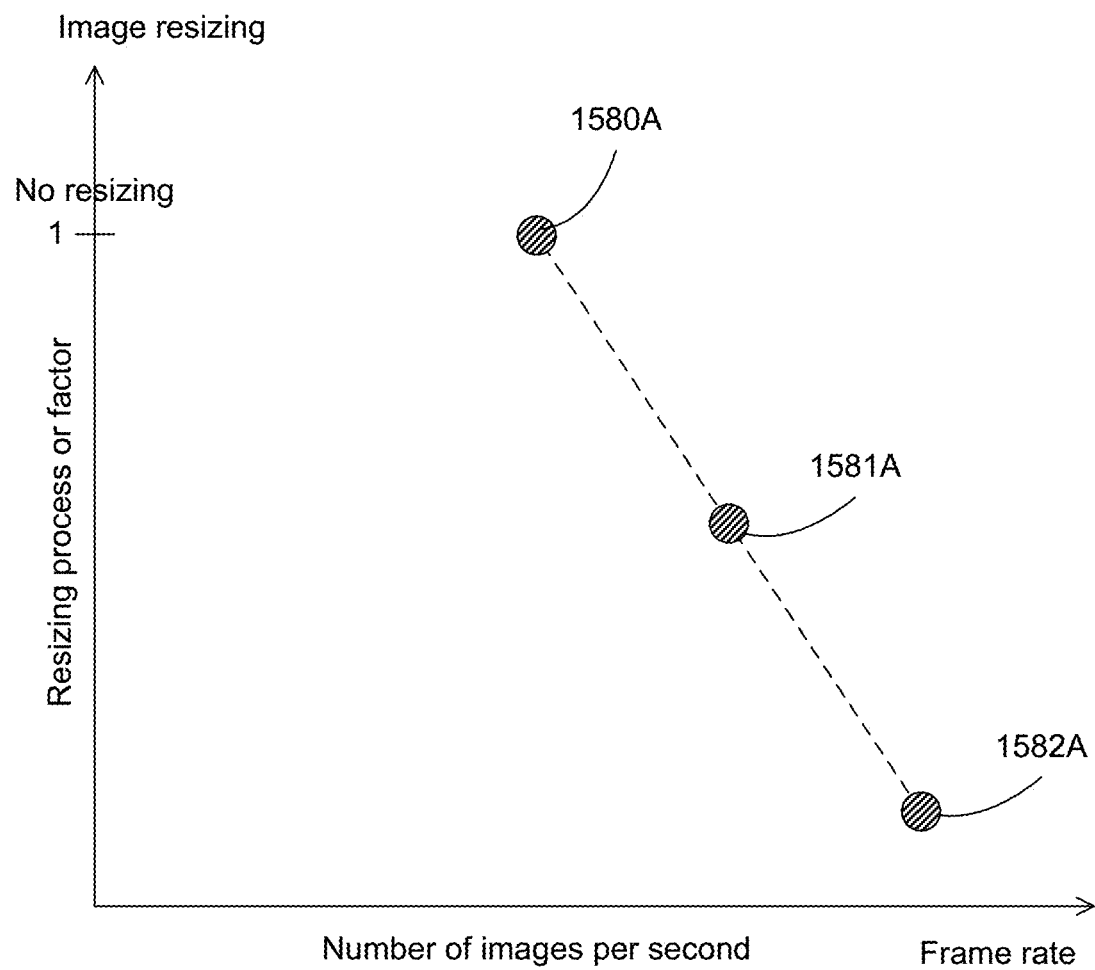
FIG. 15 illustrates a correlation between image reduction and image frame rates according to some embodiments.

FIG. 15 illustrates a correlation between image reduction and image frame rates according to some embodiments. For no image reduction, e.g., the ratio of the reduce image size and the full image size is 1, a low frame rate can be obtained at 1580A. With more image reduction, the image is reduced more and more for a lower ratio of the reduce image size and the full image size, higher frame rates can be achieved, such as at 1581A and 1582A.

The correlation between image reduction and image frame rates can allow a determination of image reduction parameters based on a desired image frame rate. For example, for a full image capture process, a frame rate of 6 frames per second can be achieved. For a desired image frame rate, such as 24 frames per second, a reduction ratio of ¼ can be selected, e.g., one pixel can be saved for every 3 discarded pixels, such as in a 2×2 pattern. Further, a reduction process can be selected, such as a sub sampling process, a binning process, a process for removing low spatial or temporal gradient pixels, or a compression process.

In some embodiments, the system, such as a microscope system, can obtain high quality image through multiple illumination patterns. Further, the system can offer tradeoff between image quality and frame rate.

Figure 16:
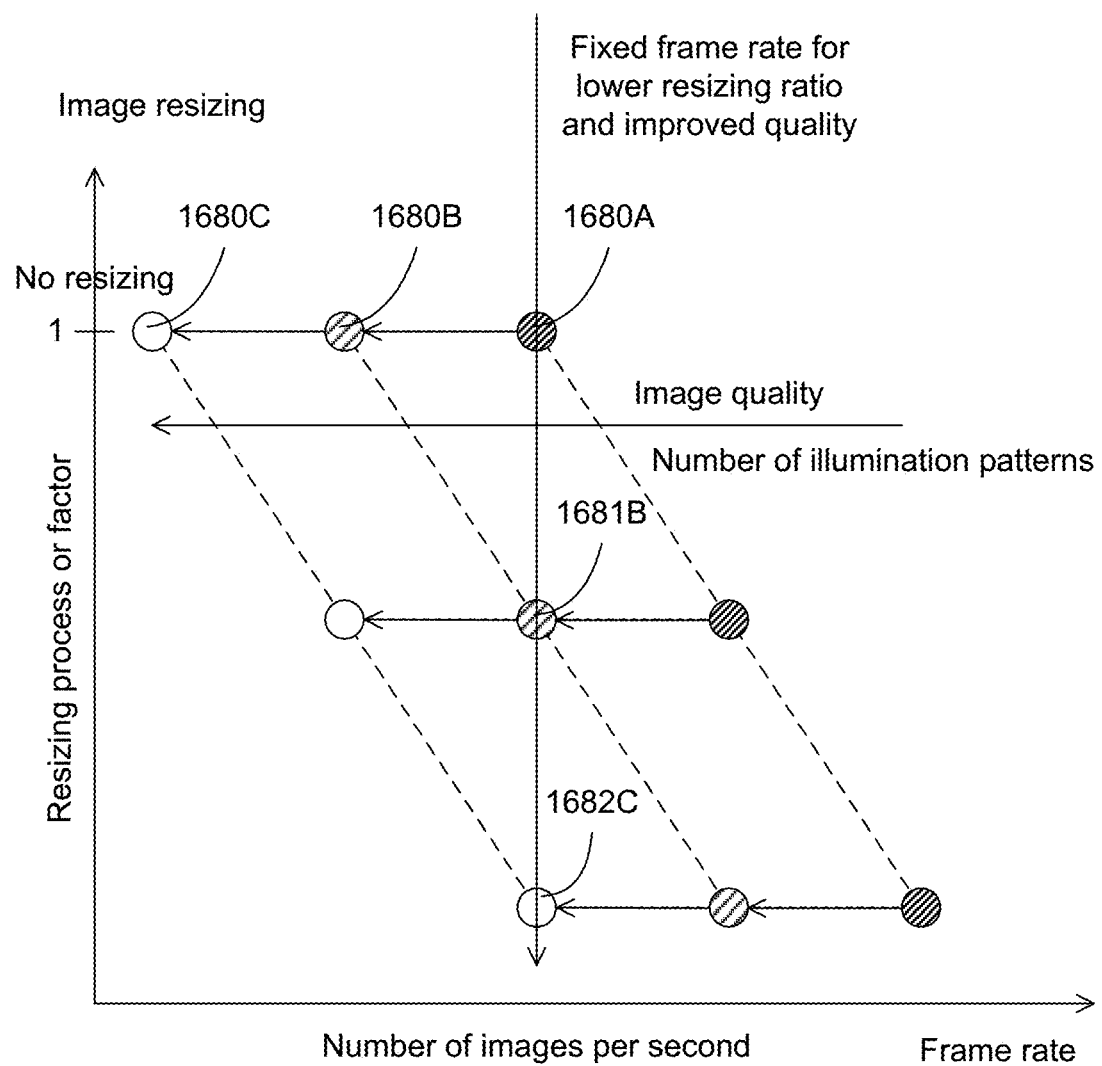
FIG. 16 illustrates a correlation between image reduction and image quality with image frame rates according to some embodiments.

FIG. 16 illustrates a correlation between image reduction and image quality with image frame rates according to some embodiments. To improve image quality with fixed reduction parameters, the frame rates can be reduced. To improve image quality with a desired frame rate, the reduction parameters can be changed to suite the desired quality and frame rate.

For example, for no image reduction, higher image quality results in lower frame rates, as shown at 1680A to 1680B to 1680C. With a fixed frame rate, higher image quality can be achieved through a reduction in resized ratios, e.g., the reduced images are smaller and smaller compared to the full image, as shown in 1680A to 1681B to 1682C.

Figure 17A:
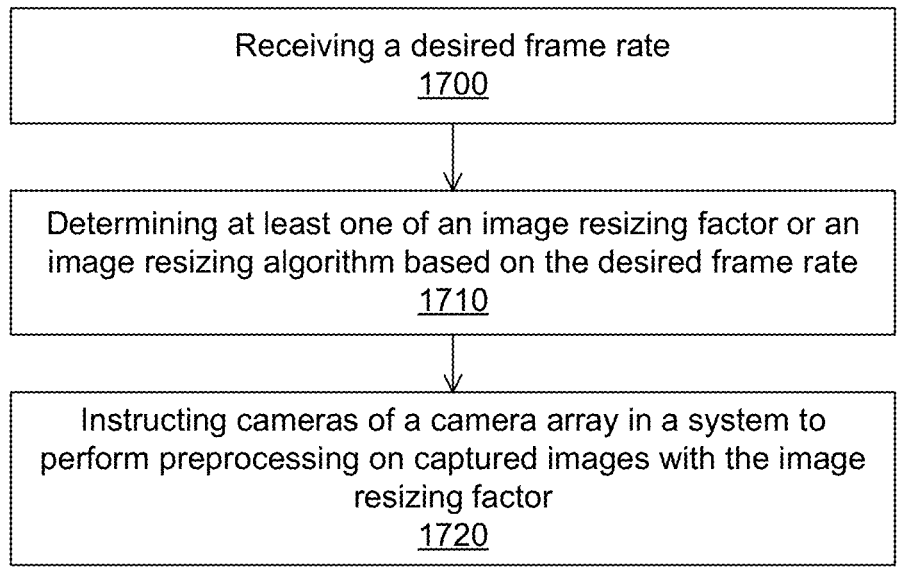
FIGS. 17A-17B illustrate flow charts for optimizing image parameters according to some embodiments.
Figure 17B:
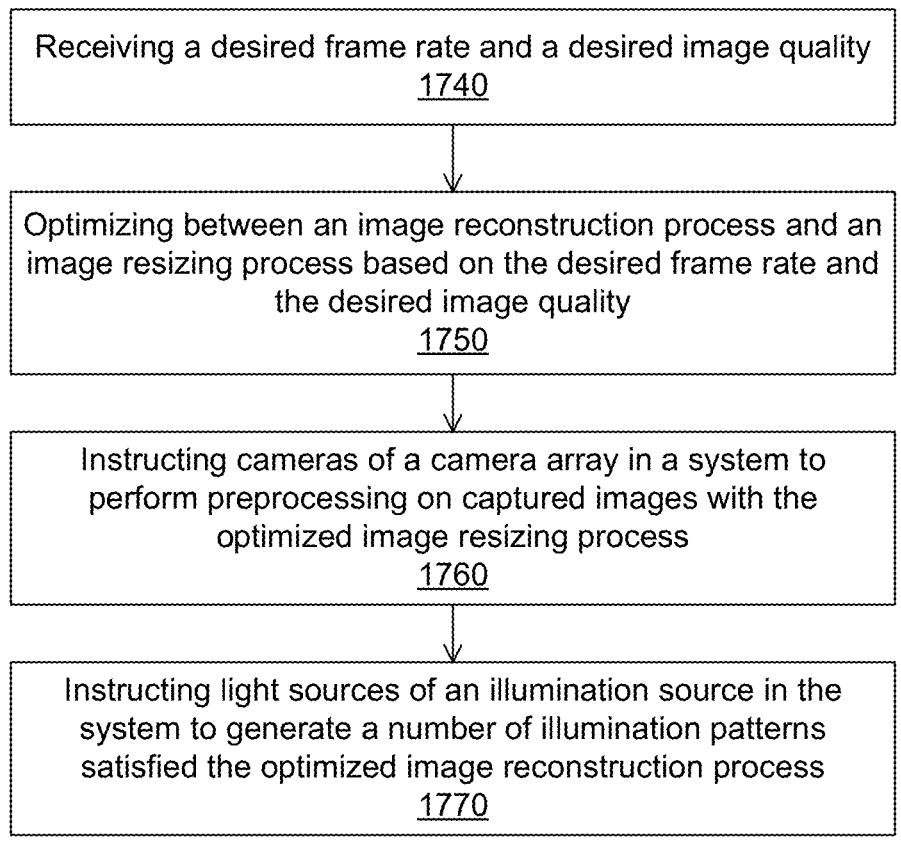

FIGS. 17A-17B illustrate flow charts for optimizing image parameters according to some embodiments. In FIG. 17A, image reduction parameters can be determined for a desired image frame rate.

Operation 1700 receives a desired frame rate. Operation 1710 determines at least one of an image reduction factor or an image reduction algorithm based on the desired frame rate. Operation 1720 instructs cameras of a camera array in a system to perform preprocessing on captured images with the image reduction factor.

In FIG. 17B, image reduction parameters and number of illumination patterns can be determined for a desired image frame rate. Operation 1740 receives a desired frame rate and a desired image quality. Operation 1750 optimizes between an image reconstruction process and an image reduction process based on the desired frame rate and the desired image quality. Operation 1760 instructs cameras of a camera array in a system to perform preprocessing on captured images with the optimized image reduction process. Operation 1770 instructs light sources of an illumination source in the system to generate a number of illumination patterns satisfied the optimized image reconstruction process.

While this invention has been particularly shown and described with references to example embodiments thereof, it will be understood by those skilled in the art that various changes in form and details may be made therein without departing from the scope of the invention encompassed by the appended claims.

What is claimed is:

1. A computational microscope comprising
   a camera array,
      wherein the camera array comprises multiple camera units,
      wherein each camera unit of the camera array is configured to capture images of an area of a sample,
      wherein different camera units are configured to capture images of different areas of the sample,
      wherein at least two different areas having images captured by two different camera units are partially overlapped,
      wherein each camera unit comprises a preprocess module configured to perform size reduction of the images captured by the camera unit;
   an illumination source,
      wherein the illumination source comprises one or more radiation source units;
   a controller,
      wherein the controller is configured to control the one or more radiation source units of the illumination source to generate one or more illumination patterns,
      wherein the controller is configured to control the camera array to capture images of areas of the sample under an illumination pattern of the one or more illumination patterns,
      wherein the controller is configured to control the camera array to perform image size reduction of the captured images,
      wherein the controller is configured to control the camera array to send the captured images with or without size reduction,
      wherein the controller is configured to form one or more sets of images received from the camera array,
      wherein each set of images comprises with-or-without-size-reduction images captured under an illumination pattern.

2. A microscope as in claim 1,
   wherein the preprocess module is integrated with an image sensor of each camera unit.

3. A microscope as in claim 1,
   wherein the size reduction comprises an image sub sampling process, an image binning process, a removal of low spatial or temporal gradient pixels, an image compression process, or any combination thereof.

4. A microscope as in claim 1,
   wherein the controller is configured to fuse the one or more sets of images into an image reconstruction of the sample.

5. A microscope as in claim 1,
   wherein the image size reduction is configured to meet an input frame rate.

6. A microscope as in claim 1,
   wherein the one or more illumination patterns are configured to meet an input comprising a quality of image reconstruction.

7. A microscope as in claim 1,
   wherein a number of the one or more illumination patterns and the image size reduction are optimized to meet a quality of image reconstruction while satisfying a desired frame rate.

8. A microscope as in claim 1,
   wherein the captured images with or without size reduction are configured to be sent directly to a memory associated with the controller.

9. A microscope as in claim 1,
   wherein the camera array is configured to sent the captured images with or without size reduction to an process module,
   wherein the process module is configured to organize the images into data packets to send to a memory associated with the controller, wherein the process module comprises matched communication interfaces between data flow from the camera array and data flow to the memory.

10. A method for operating a computational microscope, the method comprising capturing images of a sample by a camera array under one or more illumination patterns generated by an illumination source,
wherein the camera array comprises multiple camera units,
wherein each camera unit of the camera array is configured to capture images of an area of a sample,
wherein different camera units are configured to capture images of different areas of the sample,
wherein at least two different areas having images captured by two different camera units are partially overlapped,
wherein the captured images are preprocessed for size reduction in the camera array based on an image reduction parameter;
wherein the one or more illumination patterns are generated based on an image quality parameter;
assembling the preprocessed images captured under the one or more illumination patterns received from the camera array,
wherein a controller is configured to control the camera array to send the captured images with or without size reduction,
wherein each set of images comprises with-or-without-size-reduction images captured under an illumination pattern.

11. A method as in claim 10,
wherein the image reduction parameter comprises at least one of a sub sampling process, a binning process, a removal of pixels having a spatial or temporal intensity gradient less than a threshold value, or an image compression process.

12. A method as in claim 10, further comprising
fusing the preprocessed images into an image reconstruction of the sample.

13. A method as in claim 10, further comprising
inputting the image reduction parameter and the image quality parameter.

14. A method as in claim 10, further comprising
inputting a desired frame rate and a desired image quality,
determining the image reduction parameter based on the desired frame rate,
determining the one or more illumination patterns based on the desired image quality.

15. A method as in claim 10, further comprising
sending the preprocessed images in multiple parallel data streams to a process module to be organized into data packets to be sent directly to a memory of a processor,
wherein bandwidth of the data packets sent to the memory is greater than or equal to combined bandwidths of the multiple parallel data streams.

16. A method for operating a computational microscope, the method comprising providing an instruction to a camera array,
wherein the instruction comprises a desired image frame rate and a desired image quality,
determining an image reduction parameter and a number of illumination patterns to generate images meeting the desired image frame rate and the desired image quality,
capturing images of a sample by the camera array under the number of illumination patterns generated by an illumination source,
wherein the camera array comprises multiple camera units,
wherein each camera unit of the camera array is configured to capture images of an area of a sample,
wherein different camera units are configured to capture images of different areas of the sample,
wherein at least two different areas having images captured by two different camera units are partially overlapped,
wherein the captured images are preprocessed for size reduction in the camera array using the image reduction parameter;
assembling the preprocessed images captured under the number of illumination patterns.

17. A method as in claim 16,
wherein the image reduction parameter comprises at least one of a sub sampling process, a binning process, a removal of pixels having a spatial or temporal intensity gradient less than a threshold value, or an image compression process.

18. A method as in claim 16, further comprising
fusing the preprocessed images captured under the number of illumination patterns into an image reconstruction of the sample.

19. A method as in claim 16,
wherein the determination of the image reduction parameter and the number of illumination patterns is based on an optimization between the desired image frame rate and the desired image quality.

20. A method as in claim 16, further comprising
sending the preprocessed images in multiple parallel data streams to a process module to be organized into data packets to be sent directly to a memory of a processor,
wherein bandwidth of the data packets sent to the memory is greater than or equal to combined bandwidths of the multiple parallel data streams.

* * * * *

UNITED STATES PATENT AND TRADEMARK OFFICE
CERTIFICATE OF CORRECTION

PATENT NO. : 11,353,691 B1
APPLICATION NO. : 17/157911
DATED : June 7, 2022
INVENTOR(S) : Mark Harfouche et al.

It is certified that error appears in the above-identified patent and that said Letters Patent is hereby corrected as shown below:

In the Specification

In Column 1, Line 4:
Change "The present patent application claims priority from U.S. Provisional Patent Applicant Ser. No. 62/965,890, filed on Jan. 25, 2020, entitled "High-speed imaging with a sub-sampled array of image sensors", of the same inventors, hereby incorporated by reference in its entirety." to --This invention was made with Government support under R44CA250877 awarded by the NIH. The Government has certain rights in the invention. The present patent application claims priority from U.S. Provisional Patent Applicant Ser. No. 62/965,890, filed on Jan. 25, 2020, entitled "High-speed imaging with a sub-sampled array of image sensors", of the same inventors, hereby incorporated by reference in its entirety.--

Signed and Sealed this
Second Day of August, 2022

Katherine Kelly Vidal
*Director of the United States Patent and Trademark Office*